INVENTOR
Samuel W. Alderson.
BY
Edward R. Lowndes
AGENT

INVENTOR
Samuel W. Alderson.
BY
Edward R Lowndes
AGENT

Jan. 1, 1952 S. W. ALDERSON 2,580,987

ELECTRICALLY OPERATED ARTIFICIAL ARM FOR ABOVE-THE-ELBOW AMPUTEES

Filed July 10, 1948 15 Sheets-Sheet 3

INVENTOR
Samuel W. Alderson
BY
Edward R. Lounder
AGENT

Jan. 1, 1952 S. W. ALDERSON 2,580,987

ELECTRICALLY OPERATED ARTIFICIAL ARM FOR ABOVE-THE-ELBOW AMPUTEES

Filed July 10, 1948 15 Sheets-Sheet 4

INVENTOR
Samuel W. Alderson.
BY
Edward R. Lounder
AGENT

Jan. 1, 1952 S. W. ALDERSON 2,580,987

ELECTRICALLY OPERATED ARTIFICIAL ARM FOR ABOVE-THE-ELBOW AMPUTEES

Filed July 10, 1948 15 Sheets-Sheet 5

INVENTOR

Samuel W. Alderson.

BY

Edward R. Lowndes

AGENT

INVENTOR
Samuel W. Alderson
BY
Edward R. Lowndes
AGENT

Jan. 1, 1952 S. W. ALDERSON 2,580,987

ELECTRICALLY OPERATED ARTIFICIAL ARM FOR ABOVE-THE-ELBOW AMPUTEES

Filed July 10, 1948 15 Sheets-Sheet 7

INVENTOR
*Samuel W. Alderson.*
BY
*Edward R. Lowndes*
AGENT

INVENTOR
Samuel W. Alderson
BY
Edward R. Lowndes
AGENT

INVENTOR
Samuel W. Alderson.
BY Edward R. Lowndes
AGENT

Jan. 1, 1952

S. W. ALDERSON

ELECTRICALLY OPERATED ARTIFICIAL ARM FOR ABOVE-THE-ELBOW AMPUTEES 2,580,987

Filed July 10, 1948

15 Sheets-Sheet 10

INVENTOR
Samuel W. Alderson.
BY
Edward R. Saunders
AGENT

INVENTOR
Samuel W. Alderson
BY Edward R. Lowndes
AGENT

INVENTOR
Samuel W. Alderson
BY
Edward R. Lowndes
AGENT

INVENTOR
Samuel W. Alderson
BY
Edward R. Saunders
AGENT

INVENTOR
Samuel W. Alderson
BY
Edward R. Lowndes
AGENT

Jan. 1, 1952 S. W. ALDERSON 2,580,987

ELECTRICALLY OPERATED ARTIFICIAL ARM FOR ABOVE-THE-ELBOW AMPUTEES

Filed July 10, 1948 15 Sheets-Sheet 15

INVENTOR

Samuel W. Alderson

BY

Edward R. Lounder

AGENT

Patented Jan. 1, 1952 2,580,987

UNITED STATES PATENT OFFICE 2,580,987

ELECTRICALLY OPERATED ARTIFICIAL ARM FOR ABOVE-THE-ELBOW AMPUTEES

Samuel W. Alderson, New York, N. Y.

Application July 10, 1948, Serial No. 38,018

15 Claims. (Cl. 3—12)

The present invention relates to electrically operated artificial arms designed for use by above-the-elbow amputees and which may be correlated with natural arm stumps resulting from amputations and varying in length from a maximum length stump to one where the amputation occurs at or near the shoulder joint.

Generally speaking, above-the-elbow amputees may be classified in two groups, one group comprising amputees who possess an upper arm stump of sufficient length and with sufficient muscular function that it may lift and guide the artificial arm naturally throughout a wide variety of positions with little or no assistance being required by extraneous body movements on the part of the amputee. The other group consists of amputees who have an extremely short stump, no stump at all, or a stump of moderate length but with impaired muscular function. These two classes of amputees may be referred to as normal and extreme cases, respectively.

The present invention in one form thereof is designed to accommodate amputees of the first group, and in another and modified form is adapted to accommodate amputees of the second group.

It is among the principal objects of the present invention to provide an electrically driven artificial arm including an upper arm section, a forearm section, a wrist section and a hand section, together with means whereby four distinct types of motion may be imparted to the arm, such motions consisting of (1) elbow flexion, i. e., pivotal movement of the forearm section relative to the upper arm section; (2) hand flexion, i. e., pivotal movement of the hand section relative to the wrist section; (3) hand and wrist pronation, i. e., rotational movements of the hand and wrist section as a unit relative to the forearm section about the longitudinal axis of the latter, and (4) opening and closing movements of the fingers which constitute a part of the hand section.

An equally important object of the invention is to provide an artificial arm of the character outlined above in which the various relative movements of which the arm is capable of performing are accomplished solely by the power derived from a single electric motor, thus relieving the amputee from the application of fatiguing muscular power and difficult or awkward gymnastic motions.

Another object of the invention is to provide an electrical arm capable of the above mentioned movements in which any one of them may be selectively performed without disturbing or otherwise affecting the others.

Another object of the invention is to provide an electrically driven arm of this type wherein the motive force by means of which the electrical arm is powered consists of a relatively small light-weight compact motor which is wholly contained within the forearm section of the arm in the elbow region thereof and which in the assembled arm is completely concealed from view.

Another and important object of the invention is to provide a novel type of selective clutch mechanism likewise wholly contained within the forearm section for selectively controlling by a common drive from the motor the four independent types of arm movement briefly outlined above.

A still further object of the invention is to provide an electrical arm of this type in which the selective clutch mechanism consists of a self-contained unit capable of being installed in or removed from the arm with facility as a unit and which, when installed, is mounted in the forearm section by a resilient floating connection, thereby reducing vibration and protecting the same from possible shock and, as a consequence, contributing toward the elimination of noise. A similar and related object is to provide an electrical arm in which the motor is likewise mounted within the forearm section by a resilient floating connection to further reduce vibration and its attendant noise factor.

Yet another object of the invention is to provide an electrical arm capable of the four independent types of motion set forth above in which the motions may be reversed at the will of the amputee by the simple expedient of reversing the direction of rotation of the motor shaft while maintaining any one of the selected types of control in effect.

Still another object of the invention is to provide an electrical arm capable of the four independent motions outlined above and in which three of them, namely, the driving connections for accomplishing wrist flexion, hand and wrist pronation, and finger movements, are self-locking by a high ratio worm drive so that back thrust existing by virtue of the application of counter torque or pressure to any component movable part of the arm will not be carried through to the selective clutch driving mechanism, thus eliminating cumbersome and expensive independent locking mechanisms which are ordinarily provided in other types of power driven artificial arms.

A specific object of the invention is to provide an electrical arm having a hand section which closely simulates the natural hand both in shape and cosmetic appearance and in which a major group of fingers comprising the index and middle fingers are opposed to the thumb and may be moved bodily in unison relative to the thumb for the purpose of grasping objects therebetween and releasing them.

Another object of the invention is to provide an artificial arm having such a hand section in which the minor group of fingers, i. e., the ring and little fingers, are articulated in such a manner that the phalanges thereof are capable of movement relative to each other, thus permitting the fingers to assume a number of natural positions as determined by the will of the user. According to the invention, these fingers have no connection with the driving motor but are merely capable of being preset to predetermined desired positions.

Another specific object of the invention is to provide an artificial arm having a hand section in which the thumb is capable of assuming a plurality of releasable but locked positions so as to cooperate with the major group of fingers in such a manner as to accommodate the grasping of relatively large objects, such as a glass or tumbler, therebetween or of relatively small objects, such as a pencil or a sheet of paper.

Another object of the invention is to provide an artificial arm having a hand section and a wrist section, which sections are capable of continuous rotation or pronation in unison as a unit in either direction relative to the forearm, thus enabling the amputee to perform such operations, as for example, the insertion or removal of a light bulb from a lamp or wall socket, the use of a rotary tool, etc., without having to resort to oscillatory pronation and intermittent finger release as is the case with the natural hand.

Another object of the invention is to provide an artificial arm including a selective clutch mechanism, as outlined above, in which one of the clutch elements serves to effect elbow flexion and in which a friction locking device is employed to prevent flexion of the forearm relative to the upper arm when the driving motor is not in the actual driving process.

Another object of the invention is to provide an artificial arm having an elbow drive train of gears together with a limit stop which cooperates with the driving train to determine the maximum amount of elbow flexion permissible.

Another object of the invention is to provide an artificial arm including a selective clutch mechanism of the type briefly outlined above in which selection of the particular type of motion desired may be made under the control of a series of contacts adapted to be operated by relative movement of an anatomical part of the body, as for example, the big and little toes of one foot of the amputee.

Another object of the invention is to provide an electrical control for initiating energization of the driving motor and also for causing reversal of the motor under the control of the biceps muscle of the upper arm stump of the amputee or, in an extreme case where the amputee has no stump, movement of the toes on the other foot of the amputee which is not employed for effecting selective control as outlined above. Another related object of the invention is to provide an electrical over-all control in the form of an actuator switch for rendering the selective and operational controls inoperable, such switch serving to start or stop the various movements of the electrical arm as required.

Another object of the invention is to provide a novel means for supporting an electrical arm on the upper arm stump or shoulder of an amputee in which the weight of the arm is distributed over widely separated points on the body of the user to alleviate the effort required on the part of the amputee to raise or lower the arm, as well as to prevent separation of the arm from the body.

Another object of the invention in the modified form thereof is to provide an electrical arm for extreme case amputees having means associated therewith for locking the forearm section against horizontal swinging movement when the forearm is flexed less than a predetermined degree of flexion relative to the upper arm but which will permit such swinging movement when the angle of flexion exceeds the predetermined degree. By such an arrangement the amputee is afforded certain latitude of manipulation heretofore unattainable in conventional artificial arms.

Another object of the invention in the modified form thereof is to provide an artificial arm for extreme case amputees in which elevation of a shoulder blade will serve to raise the arm bodily as a whole. A related object of the invention is to provide an arm of this character in which horizontal swinging movements of the upper arm are effectively prevented when the arm is raised but are permitted when the arm is lowered to a pendant position in order that the extended artificial arm may swing in a normal manner simulating that of a natural arm during the natural gait while walking.

In carrying out the above mentioned objects, very briefly, the electrical arm proper includes four main sections, namely, an upper arm or stump-receiving section, a forearm section, a wrist section and a hand section. The upper arm or stump-receiving section is hingedly secured to the forearm section by an elbow joint. The wrist section is rotatably attached to the forearm section in axial alignment therewith. And the hand section is hingedly secured to the wrist section by a wrist flexion joint.

The hand section includes a series of fingers including a minor finger group comprising an articulated little finger and an articulated ring finger, these fingers being capable of independent movement so as to assume various convenient positions. The hand section also includes a substantially rigid mechanically movable major finger group comprising the index and middle fingers, and a substantially rigid thumb which opposes the index and middle finger group. The major finger group is capable of movement relative to the thumb to permit objects to be grasped between the fingers. The thumb is capable of being locked in either of two positions relative to the movable finger group to accommodate the grasping of objects of varying thickness. The forearm section is divided into a forearm proper and an elbow section, the latter enclosing a small electric motor and the former having disposed therein a selectively operable multiple clutch mechanism which is operatively connected to the motor and from which there extends four independent series of output gearing, one series constituting a means for affording elbow flexion, another series constituting a means for providing continuous hand and wrist pronation, another series providing for approximately 90° of wrist flexion and another series providing for finger manipulation.

Suitable means are provided for attaching the upper arm section of the electrical arm to the body of the user and since the electrical arm provides for elbow, wrist and finger motions, the body power of the amputee is reserved exclusively for motions of the upper arm section.

The selective clutch mechanism referred to above is reversible in all four phases of its operation. An electrical control means for selectively actuating the clutch mechanism is provided under the control of the amputee. A novel form of switch mechanism is located in one of the shoes of the user and may be manipulated by the toes for selectively operating the clutch mechanism to obtain the desired motions of the component parts of the arm. In the case of an amputee having a sufficiently long above-the-elbow stump including an active biceps, the stump section has associated therewith a stump switch adapted to be operated by a partial tensing of the stump biceps to provide a master control capable of energizing or deenergizing the motor so that motion or no motion of the arm is effected, as desired. The stump switch is also used to control the direction of motion of the component parts of the arm after a selection of the type of motion desired has been made by the electrical foot controls.

To maintain the electrical arm firmly in position on the body of the user and to prevent disarticulation between the upper arm section and stump and also to equitably distribute the weight of the arm about the body of the user, a cooperating shoulder harness and pelvic support is provided. The shoulder harness is operatively connected to the upper arm section of the electrical arm by a sliding hinge connection and is also connected to the pelvic support by a semi-rigid connection so that the weight of the arm is distributed between the shoulder and pelvic regions of the amputee. The specific nature of the shoulder harness and pelvic support will be varied to satisfy the exigencies of the individual amputee, but in any case, the essential features of the invention are at all times preserved.

In the accompanying fifteen sheets of drawings forming a part of this specification, several embodiments of the invention have been illustrated. These various embodiments differ only insofar as the electrical control for the arm is concerned and, in the main, the electrical arm proper is substantially the same.

Figure 3A:
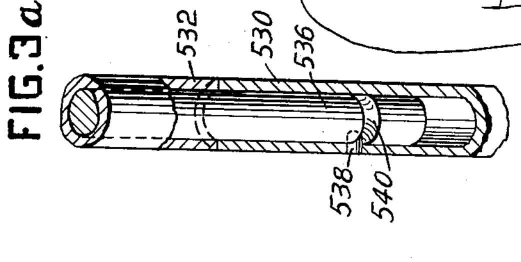

Figure 3*a* is a detail view of the connection between the shoulder strap and the abdominal or waist belt, showing the semi-rigid connection therebetween comprising a pair of steel tubes butted together over an inner bearing rod.

Figure 4:
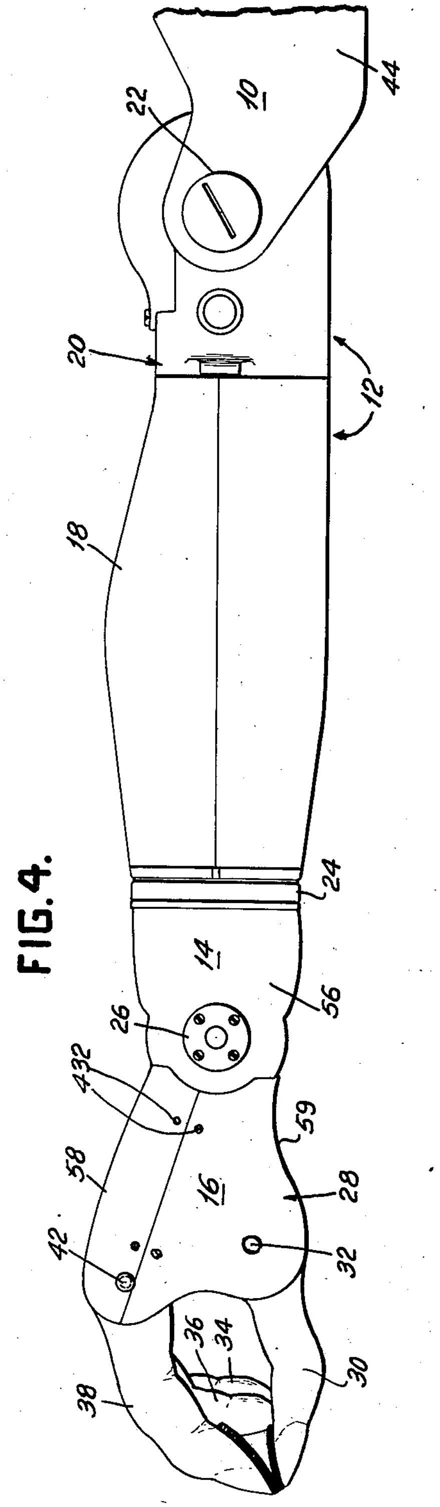

Fig. 4 is a fragmentary side elevational view of the electrical arm showing the jointed sections thereof.

Figure 5:
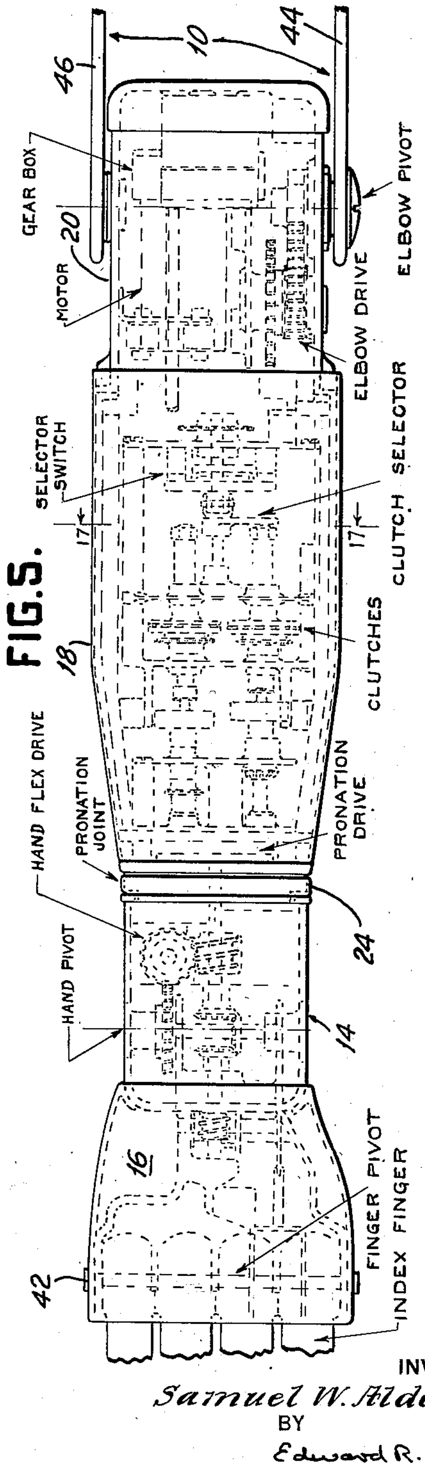

Fig. 5 is a fragmentary top plan view of the structure shown in Fig. 4 and including dotted line illustrations of internal structure of the arm mechanism, together with suitable legends therefor.

Figures 6, 7:
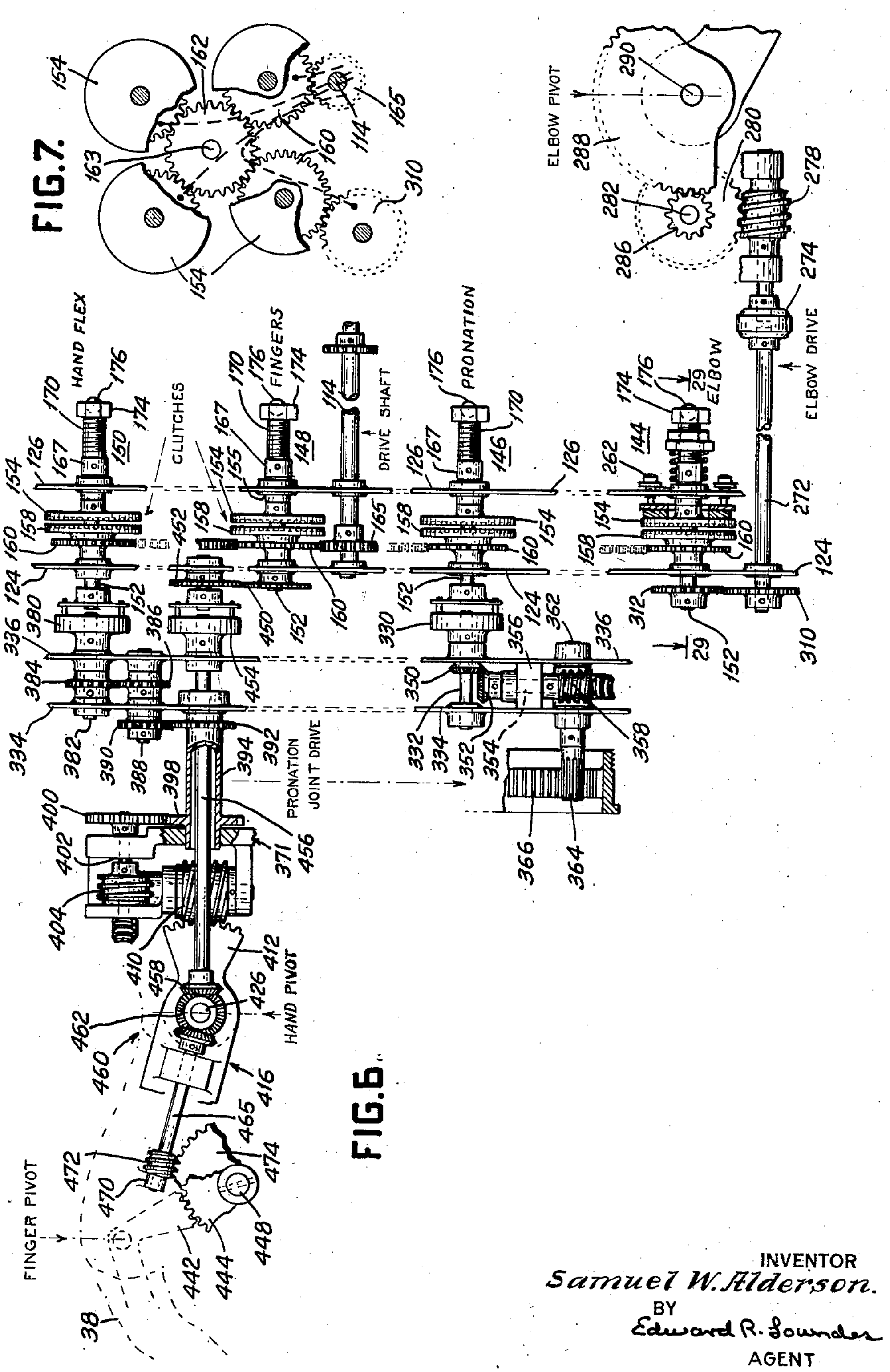

Fig. 6 is a schematic view of the various drive mechanisms and clutches employed in connection with the electrical arm illustrating the manner in which the desired arm movements may be attained upon proper clutch selection.

Fig. 7 is a schematic end view of the selective clutch mechanism employed in connection with the present invention with the clutch centers in their proper positions.

Figures 8, 10:
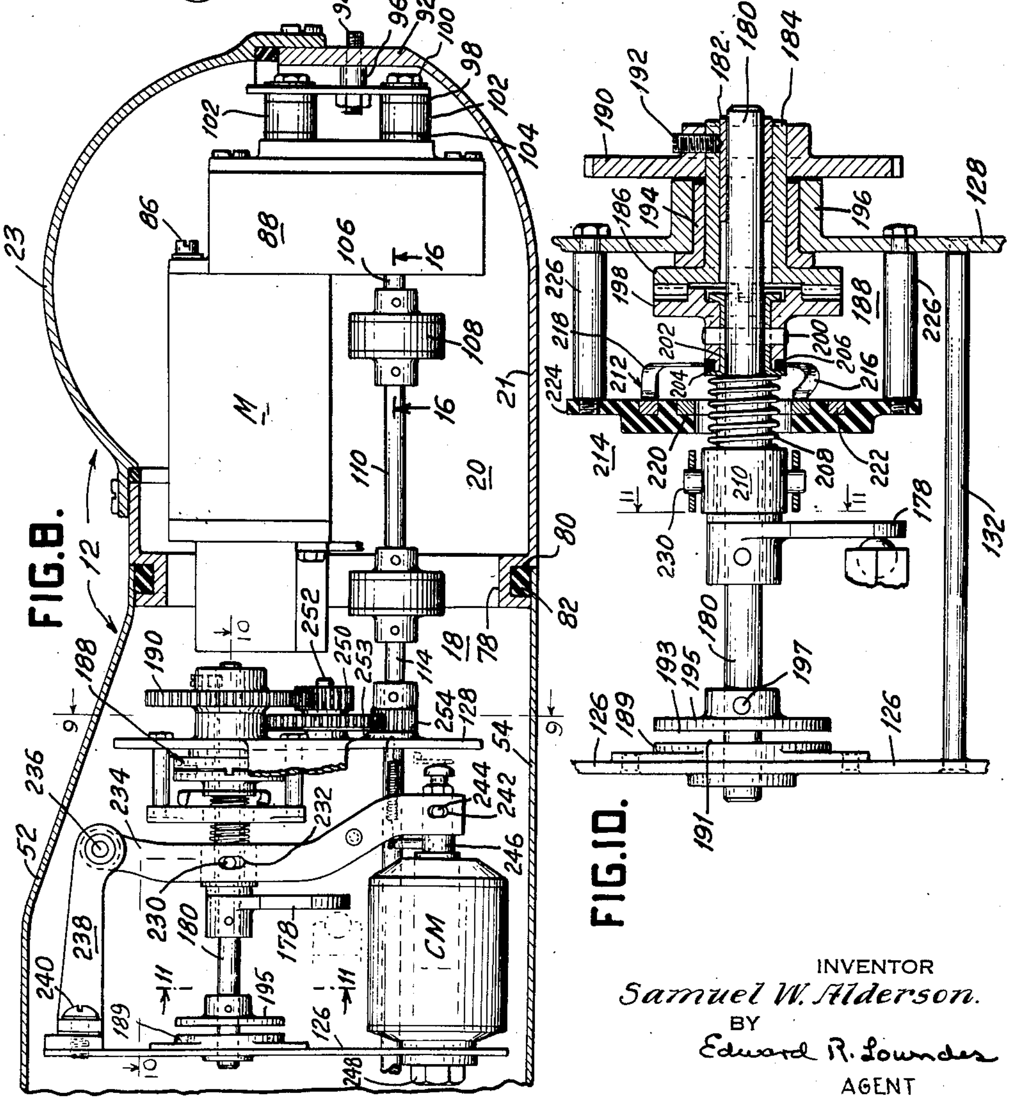

Fig. 8 is a fragmentary enlarged detailed sectional view taken longitudinally through the elbow joint structure and a portion of the forearm section proper showing the electric motor, the main driving shaft and a portion of the selecting devices for the selective clutch mechanism employed in connection with the electrical arm.

Figure 9:
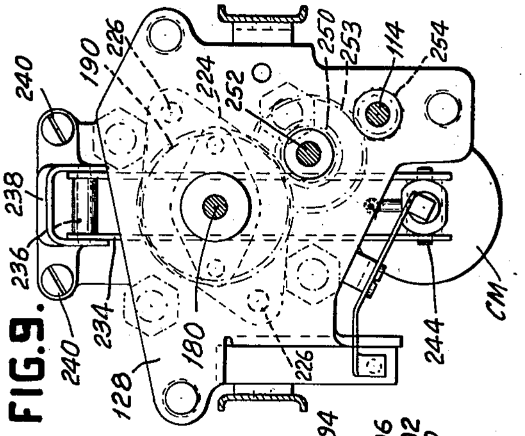

Fig. 9 is a sectional view taken substantially along the line 9—9 of Fig. 8.

Fig. 10 is a sectional view taken substantially along the line 10—10 of Fig. 8.

Figure 11:
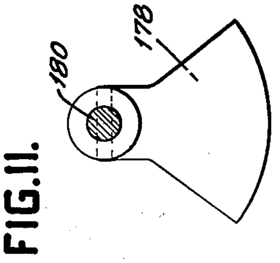

Fig. 11 is a sectional view taken substantially along the line 11—11 of Fig. 10 and showing in detail a radial clutch actuating arm employed in connection with the present invention.

Figures 12, 13:
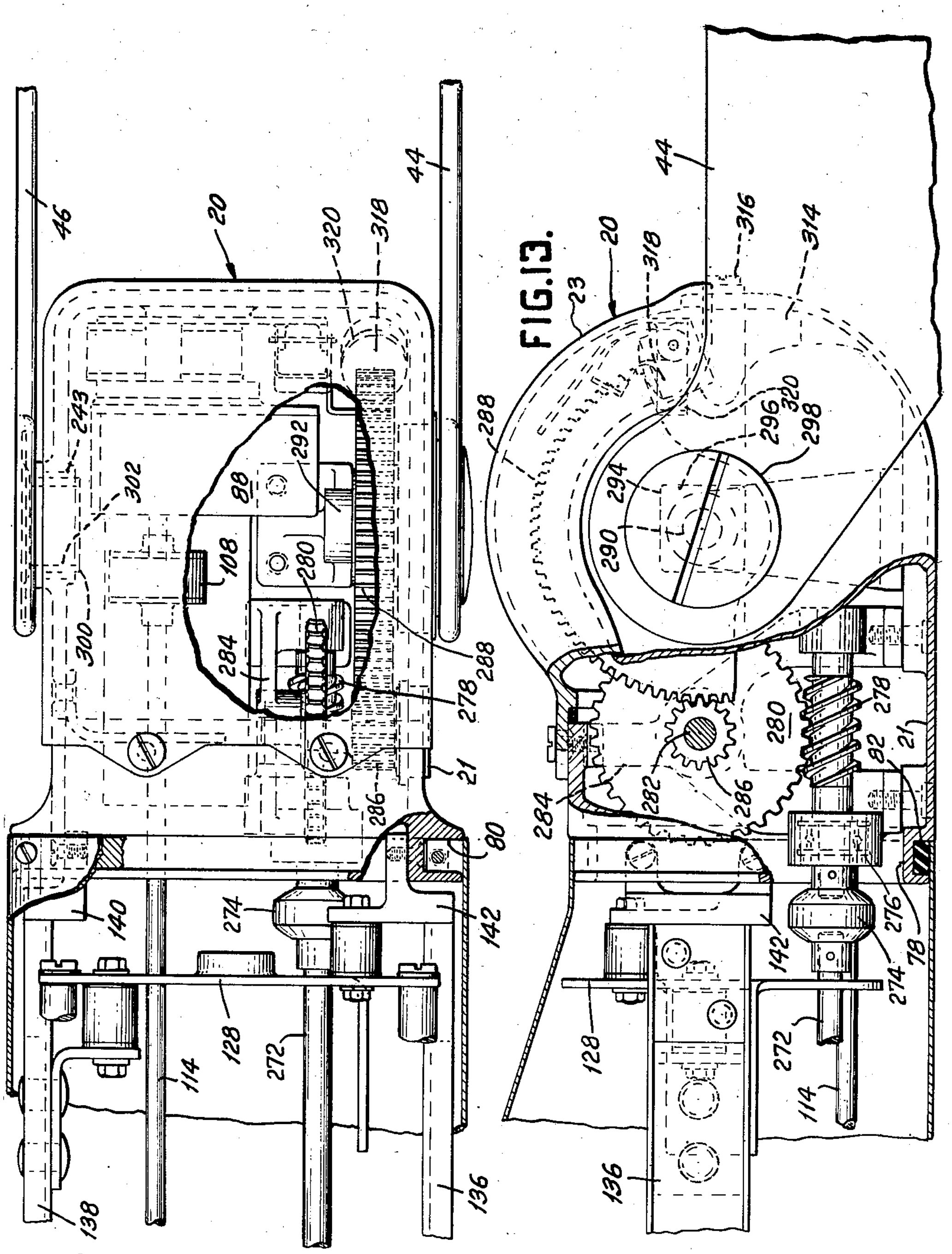

Fig. 12 is a fragmentary plan view of the elbow joint structure. In this view, portions of the outer casing have been broken away to more clearly reveal the nature of the invention.

Fig. 13 is a side elevational view of the structure shown in Fig. 12 with the casing being similarly broken away.

Figure 14:
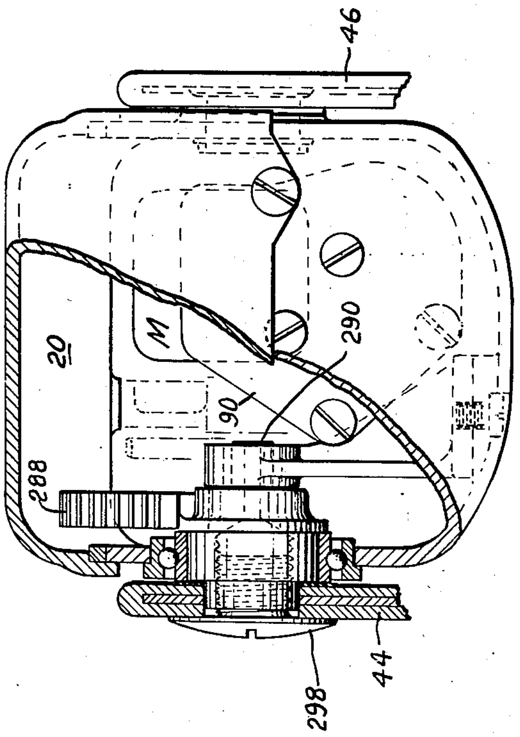

Fig. 14 is an end view of the structure shown in Fig. 13 with the casing broken away in parts.

Figure 15:
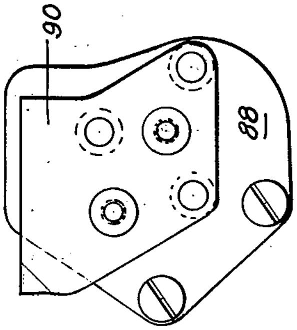

Fig. 15 is an end view of the motor unit employed in connection with the present invention.

Figure 16:
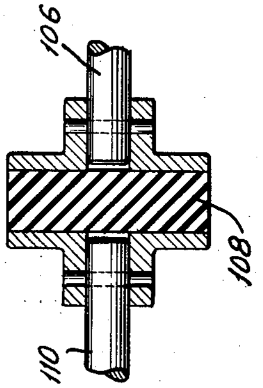

Fig. 16 is an enlarged detail sectional view taken substantially along the line 16—16 of Fig. 8.

Figures 17, 18, 19:
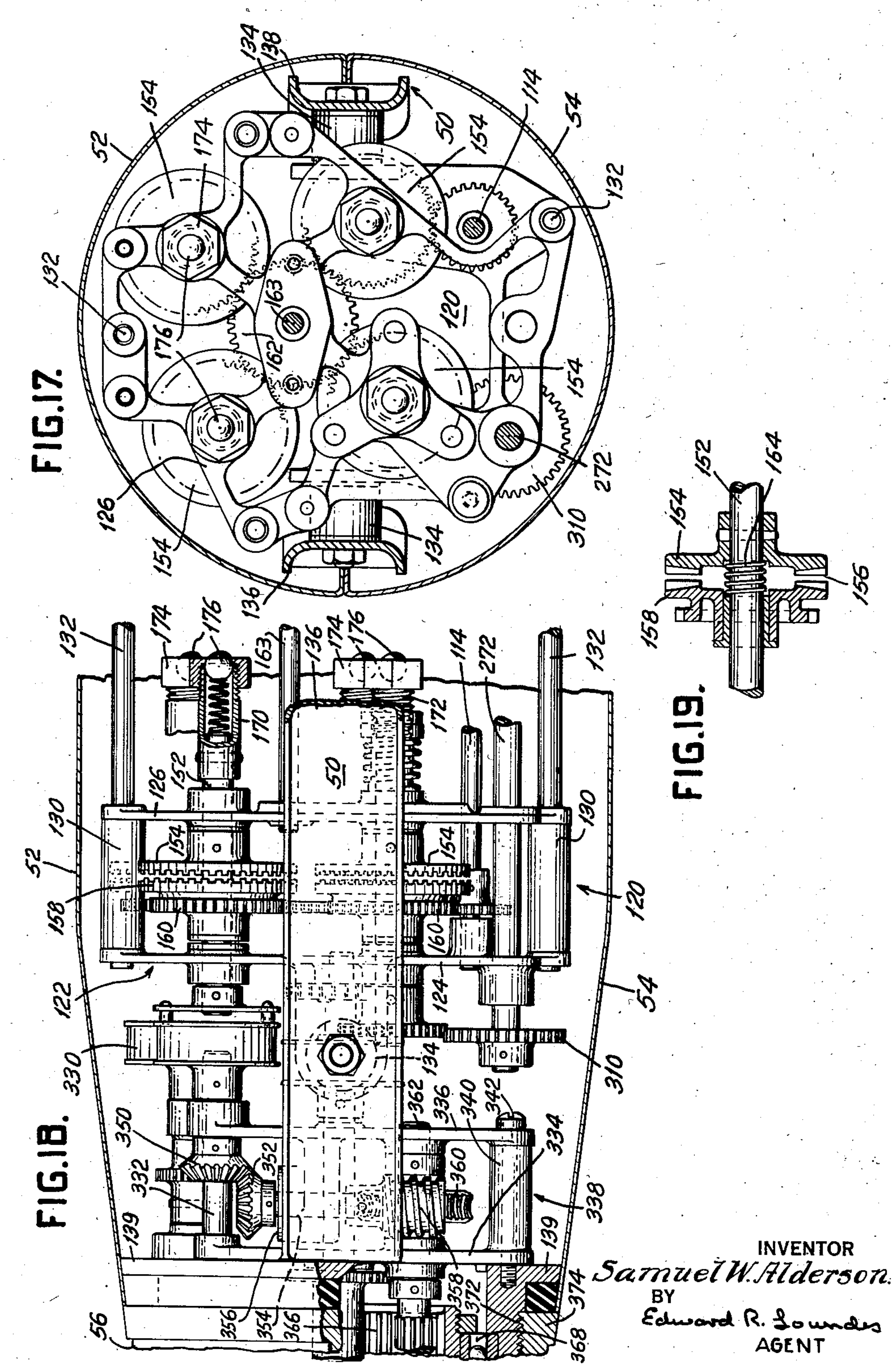

Fig. 17 is a sectional view taken substantially along the line 17—17 of Fig. 5.

Fig. 18 is a side elevational view of the structure shown in Fig. 17 with the casing broken away. This view shows the hand and wrist pronation drive mechanism.

Fig. 19 is a detailed sectional view of one of the clutch units proper employed in connection with the present invention.

Figures 20, 21:
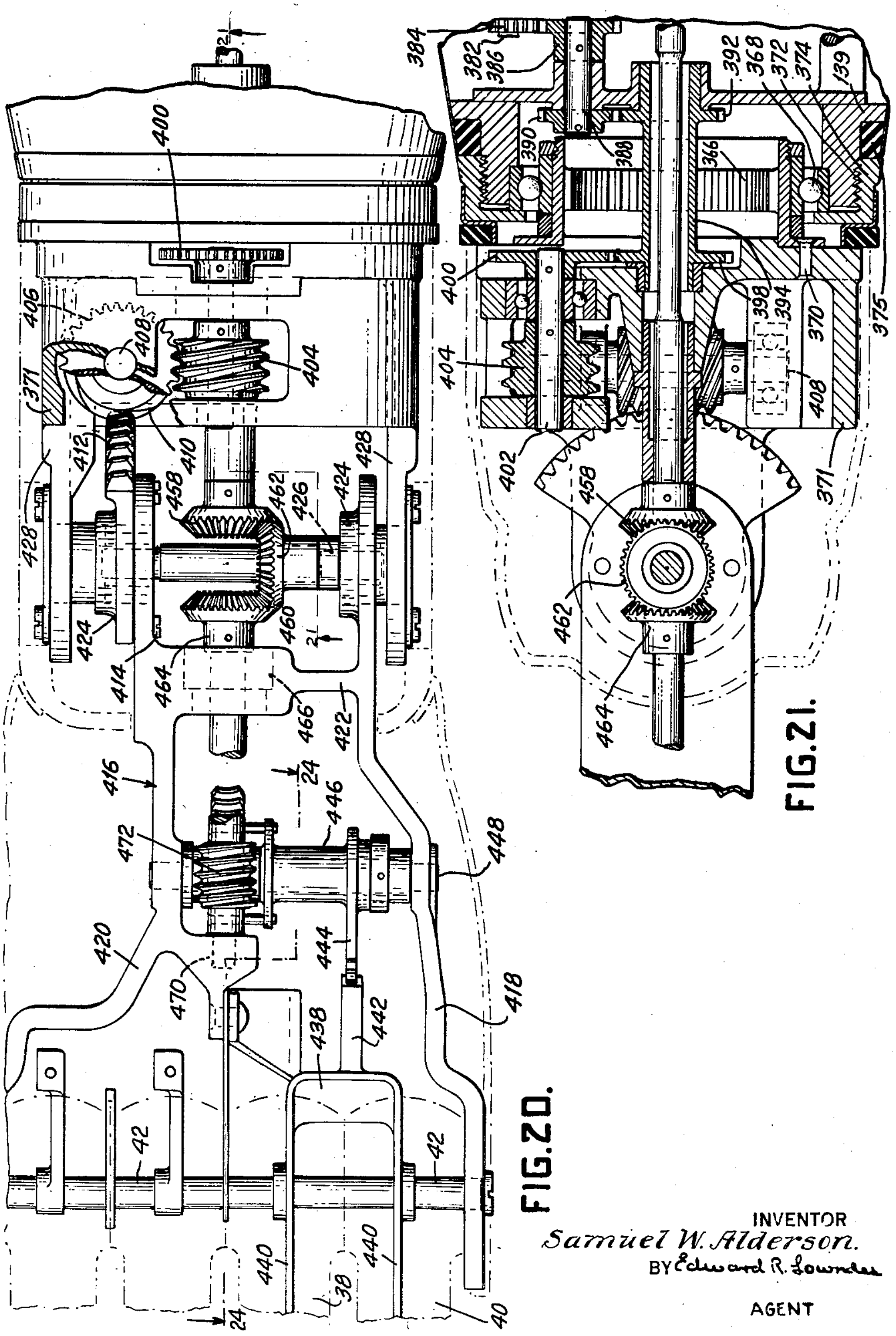

Fig. 20 is a fragmentary view of a portion of the electrical arm in the vicinity of the wrist section thereof showing the mechanism for attaining hand flexion and for manipulating the fingers.

Fig. 21 is a sectional view taken substantially along the line 21—21 of Fig. 20 illustrating the hand flexion and hand and wrist pronation driving mechanism.

Figures 22, 23, 35:
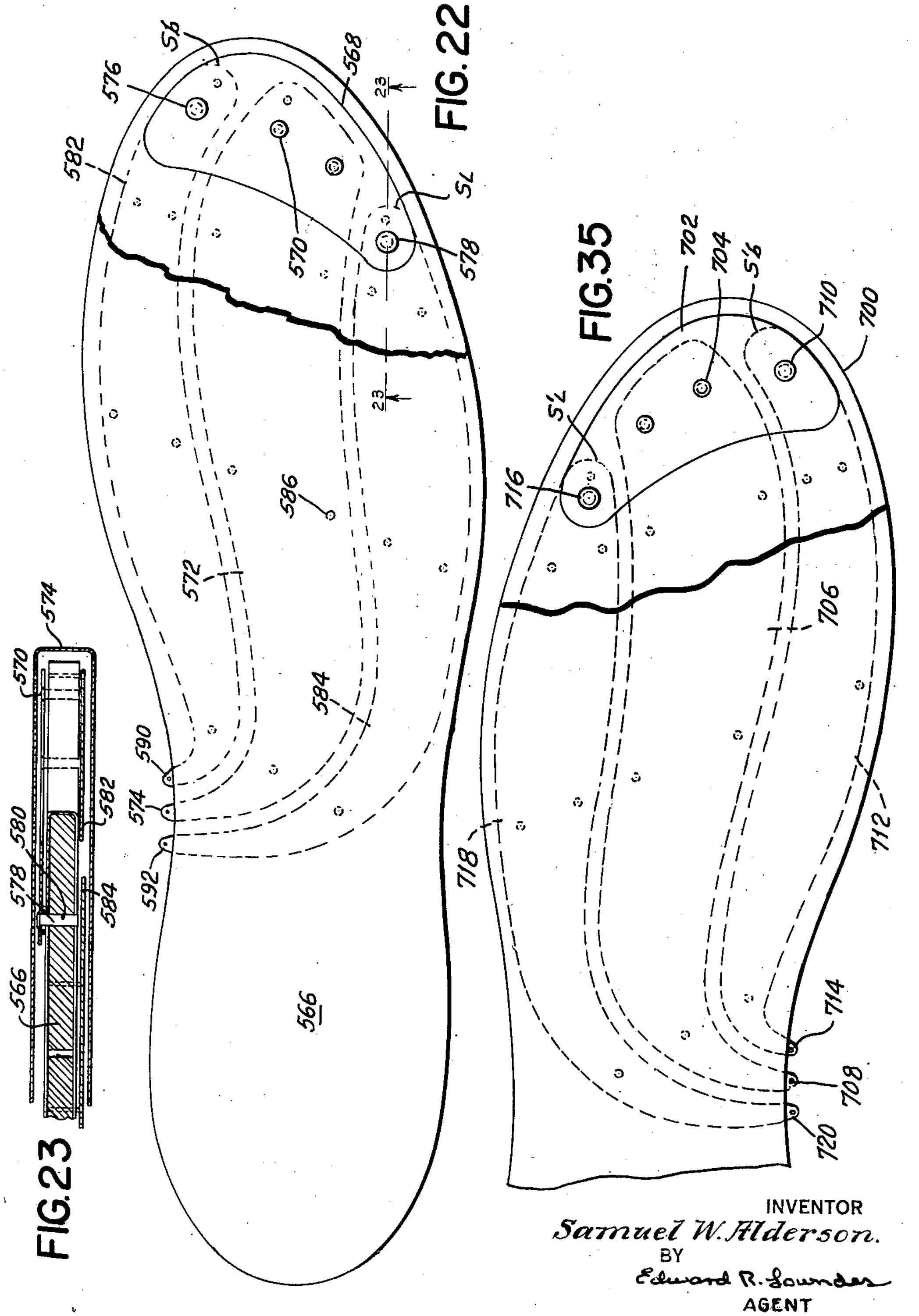

Fig. 22 is a plan view of an inner sole employed in connection with the present invention and adapted to be worn by the amputee in his shoe for controlling a series of electrical toe contacts by means of which various movements of the arm may be attained.

Fig. 23 is a sectional view taken substantially along the line 23—23 of Fig. 22.

Figure 24:
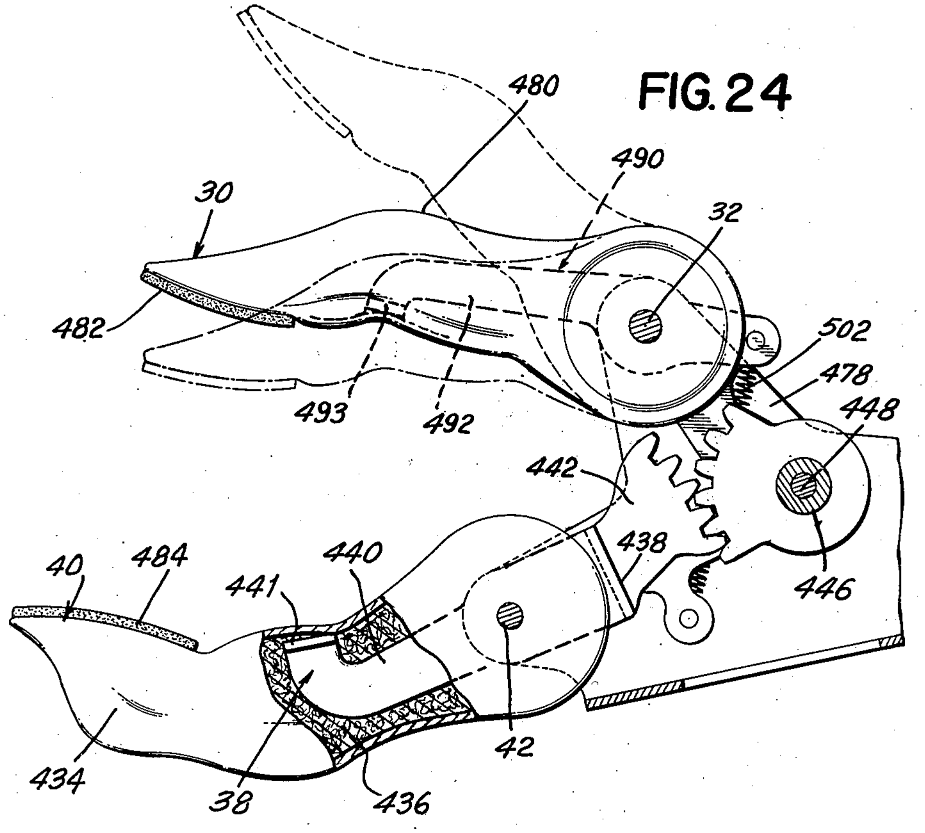

Fig. 24 is a sectional view taken substantially along the line 24—24 of Fig. 20.

Figs. 25, 26, 27 and 28 are fragmentary sectional views somewhat schematic in their representation illustrating the operation of a self-locking thumb construction employed in connection with the present invention and which is capable of being prepositioned to satisfy the preference of the user.

Figure 29:
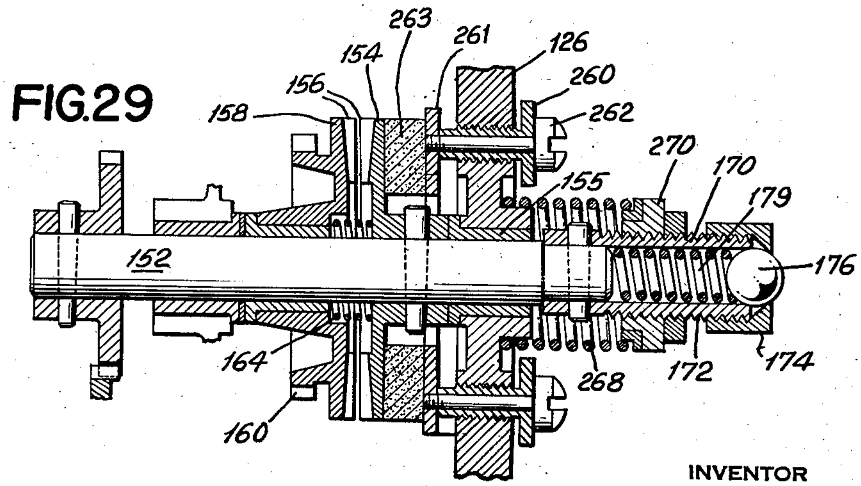

Fig. 29 is a sectional view taken substantially along the line 29—29 of Fig. 6.

Figure 30:
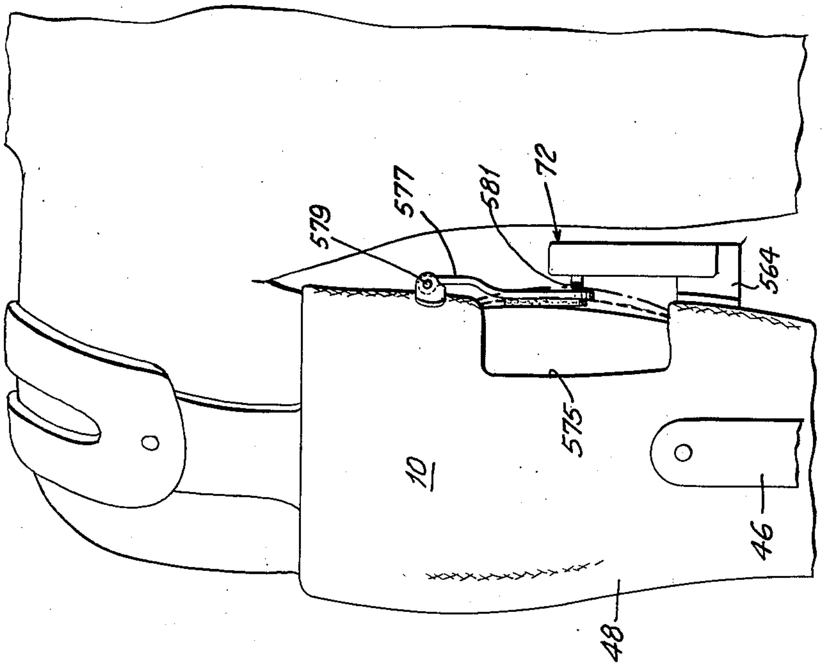

Fig. 30 (adjacent Fig. 1) is an enlarged fragmentary view of a portion of the upper arm section of the electrical arm illustrating the manner in which a stump switch employed in connection with the invention may be manipulated by the biceps muscle of the amputee.

Figure 31:
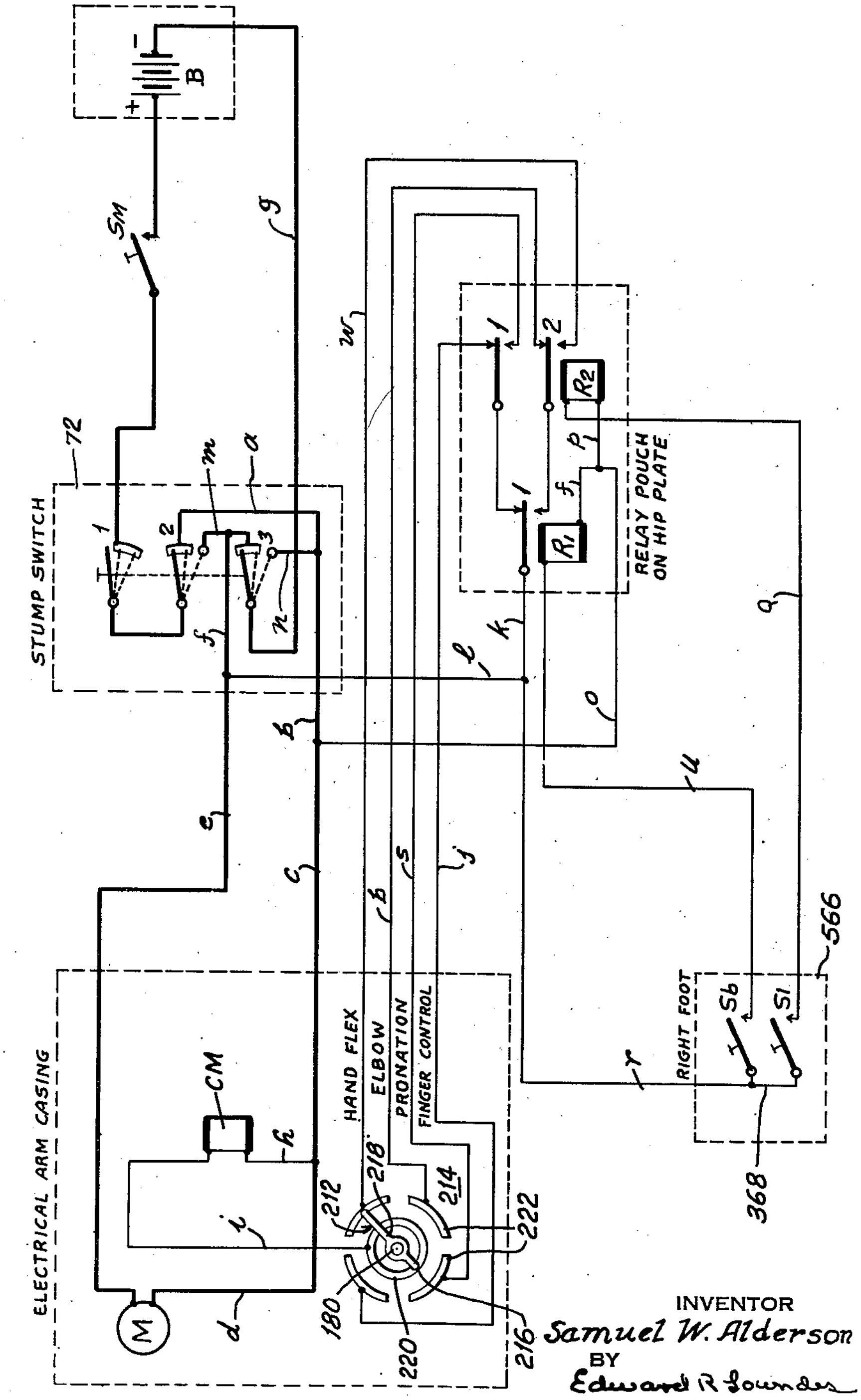

Fig. 31 is a circuit diagram of the electrical connections for the arm.

Figures 32, 33, 34:
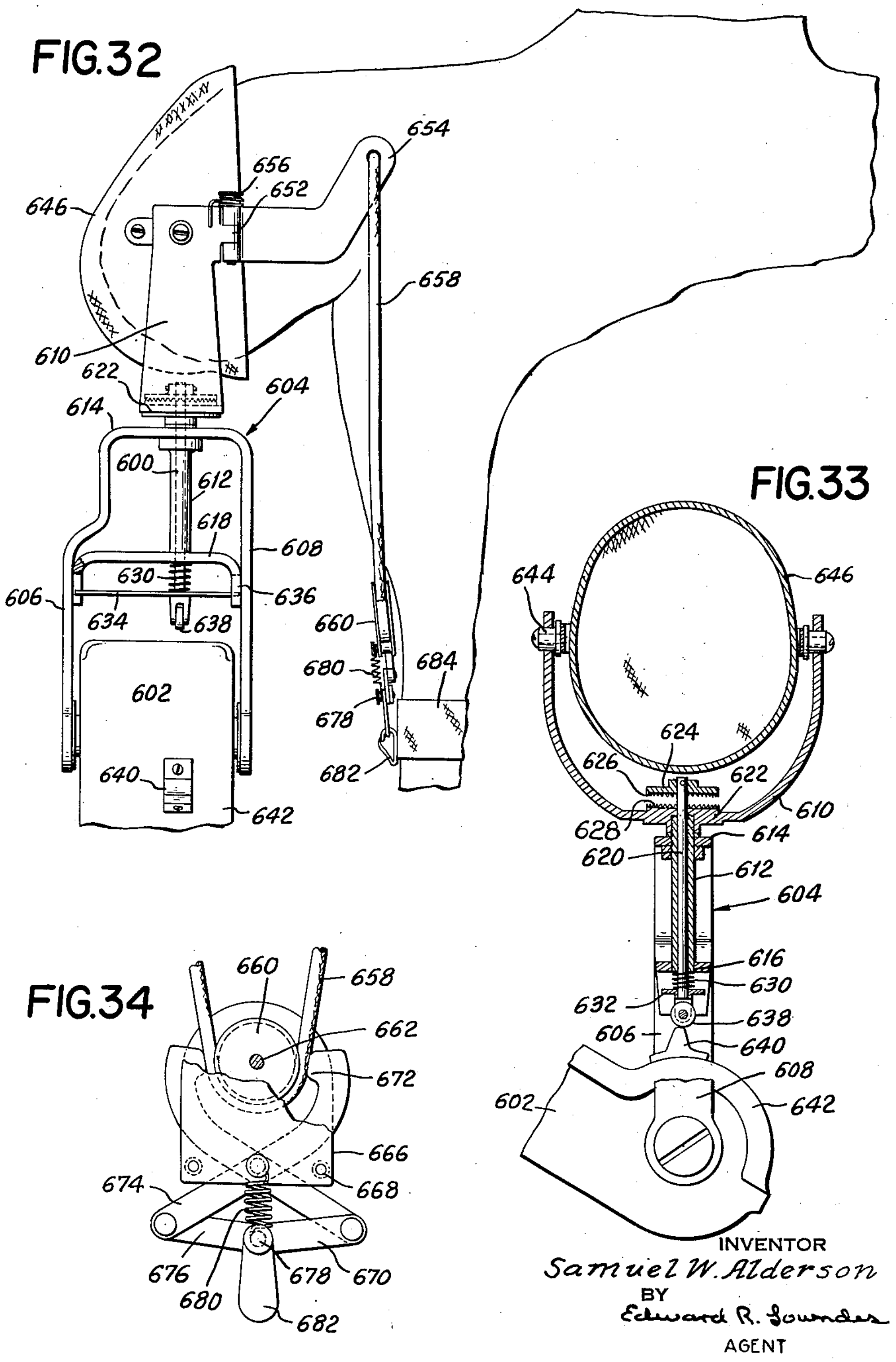

Fig. 32 is a fragmentary front elevational view of a modified form of supporting mechanism for the electrical arm and designed for use by stumpless amputees or for amputees having extremely short upper arm stumps.

Fig. 33 is a partial end view of the structure of Figure 32, including a partial sectional view of the upper arm section.

Fig. 34 is a side elevational view of a locking device employed in connection with the modified form of the invention.

Fig. 35 (adjacent Fig. 22) is a fragmentary view similar to Fig. 22 showing a portion of an inner sole adapted to be worn by an extreme case or stumpless amputee in his shoe for effecting certain electrical controls associated with the electrical arm.

Figure 36:
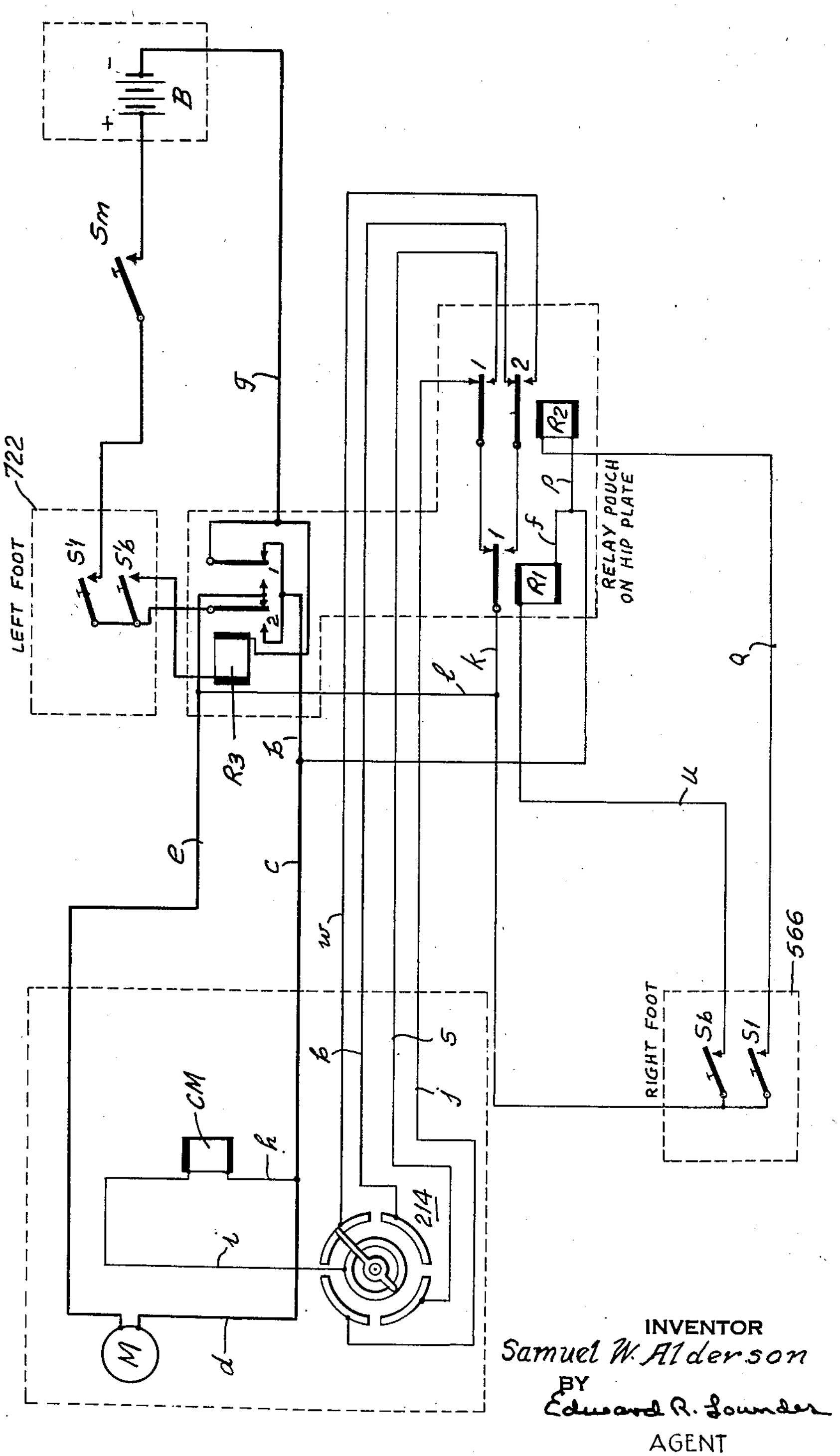

Fig. 36 is a circuit diagram of the electrical connections for the electrical arm when employed by an extreme case amputee.

In all of the above described views like characters of reference are employed to designate like parts throughout.

BRIEF DESCRIPTION

Referring now to the drawings in detail and in particular to Figs. 4 and 5, the electrical arm involves in its general organization a rigid upper arm structure fragmentarily shown at 10, a rigid forearm structure or assembly 12, a wrist assembly 14 and a hand assembly 16. The forearm assembly 12 includes a forearm section proper 18 and an elbow joint structure or assembly 20, the latter being pivotally connected as at 22 to the upper arm structure 10. The wrist assembly 14 is coaxial with the forearm section 18 and is pivotally connected to the free end of the latter for rotational movements in either direction about the common axis of the two sections by means of a pronation joint structure 24 which is common to the two sections.

The wrist assembly 14 and hand assembly 16 are pivotally connected together by a hand flexion joint 26. The hand assembly 16 includes a palm portion 28 and four independently movable digit or finger sections including a rigid thumb 30 pivotally secured as at 32 to the palm portion 28, a multiply articulated little finger 34, a multiply articulated ring finger 36 and separately molded index and middle fingers 38 and 40 respectively, which are movable in unison relative to the palm portion 28. As shown in Fig. 5, the index, middle, ring and little fingers are pivoted for swinging movement relative to the palm portion 28 on a common finger pivot in the form of a pintle pin 42.

Still referring to Figs. 4 and 5, and also to Figs. 12 and 13, the upper arm structure 10 includes a pair of spaced parallel structural members 44 and 46 which are pivotally attached by means of the connection 22 to the elbow joint structure 20 and which serve to support therebetween a tubular stump-receiving socket or casing 48 (see also Figs. 1, 2, 3 and 30). The elbow joint structure 20 is in the form of a casting 21 having a removable cover 23 and which contains the electric motor M (Fig. 8) by means of which all the operative movable instrumentalities comprising the electrical arm are selectively driven at the will of the amputee. This structure 20 also contains certain gear reduction mechanism and the gearing by means of which elbow flexion takes place and which will be described in detail subsequently.

The forearm section proper 18 involves in its general organization a forearm framework designated in its entirety at 50 (Figs. 17 and 18) which serves to support thereon a pair of forearm covers 52 and 54 which may be of a soundproof nature and which serve to enclose various clutch and gearing mechanisms, as well as certain electrical instrumentalities, the nature of which will be fully described hereinafter.

The pronation joint structure 24 in the main is in the form of a bearing member having counterparts associated with both the forearm section proper 18 and the wrist assembly 14. The wrist assembly 14 is in the form of a tubular cosmetic shell or casing 56 and within this casing there are disposed certain hand flexion driving mechanism, as well as the pivotal connection 26 for the palm portion 28. A train of driving mechanism leading from the motor M to the major finger group 38, 40 also passes through the wrist shell 56.

The palm portion 28 is in the form of a two-piece separable cosmetic shell 58, 59 in which is disposed the immediate finger driving instrumentalities, including the pivotal connections 32, 42 for the various fingers of the hand. The thumb 30 is in the form of a hollow molded cosmetic shell, as are both the index and middle fingers which operate in unison. The little and ring fingers 34, 36 are of an articulated type and are designed for independent positional movements and the nature of these fingers will be set forth subsequently.

A shoulder harness is designated in its entirety at 60 (Fig. 3) and has flexible connections with the upper arm structure 10 which prevents separation between the stump and stump-receiving socket 48 and a semi-rigid connection with a pelvic suspension device 66. The shoulder harness 60 and pelvic suspension device 66, together with the connections between them, serve to distribute the entire weight of the electrical arm between the shoulder and pelvic regions of the amputee.

The electrical arm is powered by means of a small, compact, portable battery unit B (Figs. 2 and 31) adapted to be conveniently carried in the trousers pocket 68, preferably on the same side as the amputation. The control of the various movements of the electrical arm is effected by means of a series of electrical contacts contained in one of the shoes of the user, as for example, the right shoe 70, and also under the control of a stump switch assembly 72 (Figs. 1, 2, 30 and 31). The control contacts in the shoe are utilized for the purpose of effecting the selected type of movement for the various parts of the arm, while the stump switch is employed to initiate the selected type of movement as well as for selecting a forward or reverse movement, all in a manner that will be made clear presently.

THE MOTOR, MOTOR DRIVE AND SUPPORTING STRUCTURE THEREFOR

Referring now to Figs. 8, 12, 13, 14 and 15, the motor M, which is of the direct current, reversible, permanent magnet type, is supported within the elbow joint structure 20 by means of a resilient floating connection. The elbow joint structure 20 includes a base casting 21 which is of box-like configuration and which has an open upper end adapted to be closed by means of a cover plate 23. The forward end of the elbow joint structure is provided with a rectangular channel portion 78 affording an external groove 80 adapted to receive therein a suitable sealing gasket 82 (Figs. 8 and 13) which may be formed of soft rubber or the like, and which affords a seal for the forearm section proper 18 when the cover plates 52 and 54 are in position.

The motor M is in the form of a substantially rectangular box-like casing which is bolted or otherwise secured as at 86 to a gear reduction assembly 88, likewise of box-like configuration, and which is mounted by means of a floating connection from the casting 21. The floating connection just referred to includes an upstanding bracket 90 which is secured to the end wall 92 of the casting 21 by means of through-bolts 94 and which is spaced therefrom by means of spacing collars 96. A plurality of attachment plates 98 are secured to the bracket 90 by means of studs 100 and these attachment plates 98 are fastened to respective supporting pads 102 which may be formed of resilient material such as rubber. The supporting pads 102 are fastened to respective attachment bosses 104 carried on the casing of the gear reduction assembly 88 and thus the gear reduction device and the motor are yieldingly supported from the casting 21 with the solid resilient pads 102 constituting the sole supporting means for the motor and gear reduction assembly.

The gear reduction device 88 is provided with an output shaft 106 which is connected through a resilient fastening construction 108 to a floating shaft 110 which in turn is connected through a second fastening construction 112 to a shaft 114, which may be regarded as the main drive shaft leading to the various gear train mechanisms employed for effecting the desired movements of the component parts of the electrical arm.

THE SELECTIVE CLUTCH ASSEMBLY

Referring now to Figs. 6, 7, 8, 9, 12, 13, 17, 18 and 19, the selective clutch mechanism is designated in its entirety at 120 in Figs. 17 and 18, and is a unitary self-contained assembly which is mounted within the forearm section proper 18 by means of a floating connection. The drive shaft 114 constitutes the input drive for this clutch assembly.

The clutch assembly involves in its general organization a rigid but floating frame-like structure 122 including a front end plate 124 (Figs. 6 and 18), a medial plate 126 and a rear end plate 128 (Figs. 10 and 12). The plates 124 and 126 are connected together by means of spacing members 130 and the medial plate 126 and end plate 128 are connected together by means of spacing members 132. The end plate 124 is provided with a pair of laterally extending ears 134 which are supported from a pair of longitudinally extending parallel frame members 136 and 138 integrally formed with an end piece in the form of a ring 139 constituting a part of the forearm framework 50. The frame members 136 and 138 are generally of channel-shaped construction to lend strength to the structure and they may be integrally cast with one element of the pronation joint structure 24 at the front of the forearm section proper 18. At the rear of the forearm section the members 136 and 138 are secured to a pair of block members 140 and 142 respectively, and these block members in turn are secured to the inner surface of the elbow joint structure 20 on opposite sides thereof and thus the members 136 and 138 serve to maintain the pronation joint structure 24 spaced from the forward end of the elbow joint structure 20.

The clutch mechanism proper 120 includes a series of four clutch elements 144, 146, 148 and 150. The clutch element 144 is adapted to go into operation to effect the elbow drive or, in other words, to attain elbow flexion. The clutch 146 is adapted to go into operation to effect hand and wrist pronation at the pronation joint 24. The clutch 148 is adapted to go into operation to effect opening and closing movements of the index and ring finger assembly relative to the thumb. The clutch 150 is adapted to go into operation to effect hand flexion, all in a manner that will presently be set forth.

The clutch elements 144, 146, 148 and 150 are substantially identical in construction and are mounted in the floating clutch assembly 122 at substantially equally spaced points arranged about a common center and these elements occupy the same transverse plane.

Each clutch element includes a supporting shaft 152 which is rotatably journaled in the front and medial plates 124 and 126. The clutch elements are of the reverse acting type, that is to say, the driven element of the clutch may coact with the driving element thereof to effect rotation of the clutch elements in opposite directions to reverse whichever character of motion of the electrical arm is selected. A driven element 154 is mounted upon and secured to the shaft 152. This element is in the form of a circular disc having outwardly projecting clutch teeth 156 on one side thereof. These teeth oppose a series of similar teeth provided on the driving element 158 of the clutch. The driving element is similar in configuration to the driven element and is rotatably mounted on the shaft 152 in close proximity to the driven element. Each driving element includes an integrally formed gear 160 and all four of the gears 160 are in constant mesh with an idler gear 162 mounted on a shaft 163 rotatably journaled in the front and medial plates 124, 126. The gear 160, which is integrally formed with the clutch 148 and which controls the opening and closing movements of the fingers, meshes with a driving gear 165 mounted on the drive shaft 114 and thus when the motor is energized and the drive shaft 114 is rotated, a drive is transmitted from the gear 165 to the gear 160 of the clutch 148 and from thence through the idler gear 162 to all of the clutch elements 158 so that these elements rotate in unison.

When the arm is at rest and no relative motion between any of the component parts thereof is contemplated, the drive shaft 114 remains stationary due to lack of energization of the motor M. As soon as a selected movement of the arm is contemplated, the motor M is energized by means of a suitable control to be described subsequently and the drive shaft 114 commences to rotate in the selected direction, thus causing all four of the driving gears 160, and consequently all four of the driving elements 158, to rotate in unison. Until one of the clutches 144, 146, 148 or 150, as the case may be, is thrown into meshing engagement no movement of any parts of the arm will result and when the selected clutch is finally engaged one of the four types of movement, namely, opening and closing of the fingers, hand and wrist pronation, hand flexion or elbow flexion, is attained. In Fig. 6 the various drives for effecting these motions is schematically shown.

Each shaft 152 is slidably, as well as rotatably, mounted in the front and medial plates 124, 126 and the limited amount of sliding movement of which the shaft is capable is determined by the provision of a collar 167 which is secured on the shaft and by the position of the driven clutch element 154. In the normal open or inoperative position of the clutch, the clutch element 154 abuts against a supporting bushing 155 which is anchored in the medial plate 126. In the closed or operative position of the clutch, the collar 167 abuts against this bushing. The clutch elements 154 and 158 are maintained separated by means of a spring 164 (Figs 19 and 29). Each shaft 152 projects completely through the medial plate 126 rearwardly thereof and has mounted thereon and secured thereto an elongated sleeve 170 which is threaded as at 172 along a major portion of its length and which is adapted to receive thereon an anti-friction bearing assembly in the form of a retaining nut 174 in which there is disposed a hardened steel ball 176 designed for cooperation with a clutch actuating finger 178 (see Figs. 10 and 11) carried on a selector shaft 180. A coil spring 179 is disposed within the sleeve 170 and bears at one end against the ball 176 and at the other end against the end of the shaft 152 to transmit any thrust exerted upon the ball 176 to the shaft 152 for clutch engaging purposes.

The shaft 180 (Figs. 8, 10 and 11) is capable of limited slidable movement in an axial direction and, toward this end, one end thereof is rotatably and slidably disposed in the medial plate 126 of the floating framework 122 and the other end thereof is slidably mounted in a bushing 182 which is pressed into the bore of the sleeve portion 184 of a clutch element 186 forming one part of a clutch assembly 188. The sleeve portion 184 has mounted thereon a gear 190 and a set screw 192 extends through the hub portion of the gear 190 and through the sleeve 184 and bears against the bushing 182 to retain the same in fixed position relative to the gear 190. The sleeve portion 184 of the clutch element 186 is journaled in a sleeve 194 which is fitted within a hub or boss 196 formed in the end plate 128 of the framework 122.

The clutch assembly 188 includes a second clutch part 198 which is pinned as at 200 to the shaft 180 and which, as a consequence, is rotatable and axially movable therewith. A spool-like sleeve 202 surrounds the shaft 180 and is concentric with the clutch part 198. This spool-like sleeve 202 is provided with an out-turned flange 204 which serves to retain an insulating ring 206 in position on the clutch part 198. A spring 208 surrounds the shaft 180 and bears at one end against a collar 210 and at the other end against the clutch part 198 and serves to normally maintain the clutch assembly 188 engaged.

A friction member 189 is secured to the plate 126 and is provided with a friction surface 191 designed for cooperation with a friction surface 193 carried on a friction disc 195 secured as at 197 to the shaft 180. Inasmuch as the spring 208 normally urges the shaft 180 to its extreme right-hand position, as shown in Fig. 10, the friction disc 195 is normally maintained out of engagement with the friction member 189.

A brush 212 forming part of a distributor assembly 214 (see also Fig. 31) is mounted in the insulating ring 206 and is provided with a short finger 216 and a long finger 218, the former bearing against an inner distributor ring 220 and the latter bearing against a series of outer distributor segments 222 carried in a distributor block 224 which is supported by means of spacing members 226 from the end plate 128.

The collar 210 is provided with a pair of trunnions 230 which project into slots 232 formed in a yoke 234 which is pivoted as at 236 to a bracket 238 which is bolted or otherwise secured as at 240 to the plate 126. The other end of the yoke 234 is provided with a pair of slots 242 into which there extend a pair of trunnions 244 carried on the core element 246 of a clutch magnet CM bolted or otherwise secured as at 248 to the plate 126.

From the above description of parts it will be seen that upon energization of the clutch magnet CM its core 246 will be attracted, thus swinging the yoke member 234 in a clockwise direction about its pivotal axis 236, so as to cause the trunnions 230 on the collar 210 and, consequently, the collar itself, to be moved axially to the left as viewed in Figs. 8 and 10. Such movement of the collar 210 causes the shaft 180 to be moved axially, thus removing the driven element 198 of the clutch assembly 188 from engagement with the driving element 186 thereof and causing the friction surfaces 191 and 193 to become engaged, thus terminating further rotation of the shaft 180 so that the selector finger 178 ceases its revolution about the axis of the shaft 180.

Referring now to Fig. 8, the gear 190 meshes with a smaller gear 250 mounted on a stud 252 carried by the rear end plate 128. The gear 250 is integrally formed with a larger gear 253 and this latter gear meshes with a smaller gear 254 mounted on the drive shaft 114. As will be pointed out hereinafter, upon closure of the various electrical contacts employed in connection with the operation of the electrical arm, the motor M will be energized and the drive shaft 114 caused to rotate, thus causing the shaft 180 to be rotated and causing the selector finger 178 to revolve about the axis of the shaft 180. Immediately after the motor becomes energized, selection of a predetermined type of motion is made and the selector finger 178 moves into register with one of the clutch assemblies 144, 146, 148 or 150, as the case may be, after which, due to certain relay instrumentalities employed in connection with the present invention, the clutch magnet CM becomes energized and, as a consequence, the shaft 180 is caused to be moved to the left, as viewed in Fig. 10, thus carrying with it the selector finger 178 which bears against the hardened steel ball 176 of the selected clutch assembly to move the clutch element 154 into engagement with the constantly rotating clutch element 158.

THE ELBOW DRIVE GEAR TRAIN

Referring now to Figs. 4, 5, 6, 7, 12, 13, 14 and 29, the clutch assembly 144 (Fig. 6) is the one which controls movement of the train of gears leading to the elbow flexion joint or pivot 22 and the immediate operating instrumentalities for which are contained within the elbow joint structure 20 of the forearm structure 12.

While the hand flexion, hand and wrist pronation and finger control clutch assemblies 150, 146 and 148 respectively, are identical in construction, the clutch 144 which controls the elbow movements of the arm differs slightly from the others in that it has associated therewith a friction clutch mechanism for locking the two movable sections of the elbow in any desired position of angularity so that the weight of the forearm structure, together with any object which may be held in the hand, will not place a permanent stress on the elbow drive train of gears.

Referring now to Figs. 6 and 29, a series of adjusting sleeves 260 extend through and are threadedly received in the plate 126 and project forwardly thereof. A backing plate 261 is adapted to be clamped against the forward end of the adjusting sleeves 260 in any desired adjusted position of the latter by means of clamping screws 262 which project through the sleeves 260 and extend into the backing plate 261. The backing plate 261 has fastened thereto on the forward side thereof a resilient brake member 263 in the form of a ring, the forward surface of which is designed for braking engagement with the outer surface of the driven element 154 of the clutch assembly 144. A coil spring 268 surrounds the sleeve 170 and bears at one end against the frame plate 126 and at the other end against one of a pair of locking nuts 270 threadedly received on the sleeve 170. The spring 268 therefor serves to augment the action of the spring 164 in maintaining the clutch elements 154, 158 separated but this action is merely incidental and the true action of the spring 268 is to cause the driven element 154 to bear against the braking ring 263 when the clutch 144 becomes disengaged to prevent rotation of the driven element 154 and thus lock the forearm section of the arm in whatever definite angular position relative to the upper arm structure it may have attained at the moment the two clutch elements 154 and 158 become disengaged.

Still referring to Fig. 6, and additionally to Figs. 12 and 13, an elbow drive shaft 272 is supported adjacent one end in the plate 124 of the floating clutch assembly and passes through the frame plate 128 adjacent the other end thereof and includes a flexible fastened joint 274, similar to the previously described fastened joints 108 and 112 associated with the main drive shaft assembly 110, 114. The shaft 272 is supported in an anti-friction bearing 276 carried by the casting 21 of the elbow joint structure 20. Adjacent its rear end, the shaft 272 is provided with a worm 278 which meshes with a worm gear 280 mounted on a shaft 282 rotatably journaled in a support or standard 284 integrally formed with the casting 21 of the elbow joint structure 20. The shaft 282 also carries a relatively small gear 286 which meshes with a gear sector 288 mounted on a shaft 290 rotatably journaled at one end in a stationary support 292 and at the other end in an anti-friction bearing 293 in the side wall of the casting 21. The shaft 290 is provided with a squared portion 294 which is adapted to receive thereover a square opening 296 provided in the structural member 44 of the upper arm structure 10. A securing bolt 298 is threadedly received in the end of the shaft 290 to retain the squared portion 294 in position within the opening. The other structural member 46 is provided with a stud shaft 300 which projects into an opening 302 in the casting 21 and in which opening the stub shaft 300 is pivotally supported. The two structural members 44 and 46 of the upper arm structure 10 by their inherent resiliency are capable of being spread apart to permit them to straddle the elbow joint structure 20 so that upon release of the tension applied to them they will snap into position with the stub shaft 300 being received in the opening 302 and with the square opening of the member 44 fitting over the squared portion 294 of the shaft 290. Such an arrangement is provided for ease of assembly and disassembly between the elbow joint structure 20 and upper arm structure 10.

The forward end of the elbow drive shaft 272 carries a gear 310 (Figs. 6 and 18) which meshes with a similar gear 312 mounted on one end of the shaft 152 associated with the clutch assembly 144. It will be seen, therefore, that when the clutch assembly 144 is engaged and the parts thereof rotated in one direction or the other, a drive will exist directly from the driven element 154 of the clutch 144 through the shaft 152, gears 312, 310, shaft 272, worm 278, gears 280 and 286 to the gear sector 288. Turning movements of the gear sector 288 in one direction or the other relative to the casting 21 in which it is mounted will thus cause flexing of the elbow joint structure.

Referring now to Figs. 12 and 13, a block 314 is secured as at 316 to the inside of the casting 21 at the rear thereof and affords a shelf-like support for a limit stop or bumper, the latter being in the form of a rubber or other resilient member 318 of cylindrical configuration which is fastened to the block 314 and to which there is also fastened a disc-like abutment plate 320. The plate 320 is positioned in the path of movement of the gear sector 288 and serves to limit the extent of its swinging movement to consequently limit the degree of flexion of the elbow joint.

THE HAND AND WRIST PRONATION GEAR TRAIN

Referring now to Figs. 4, 5, 6, 18, 20 and 21, the clutch assembly 146 operates through a gear train mechanism to drive the hand and wrist pronation joint 24 and, toward this end, the shaft 152 (Fig. 6) is connected by means of a flexible coupling 330 to a shaft 332 journaled between the side members 334 and 336 of a casting designated in its entirety at 338 and including longitudinal struts 340 through which anchoring screws 342 extend and are threadedly received in the stationary ring member 139 which constitutes a part of the forearm framework 50.

The shaft 332 carries a bevel gear 350 which meshes with a similar bevel gear 352 mounted on a shaft 354 journaled in anti-friction bearings 356 carried in the casting 338. The shaft 354 carries a worm 358 which meshes with a worm wheel 360 mounted on a shaft 362 journaled between the side members 334 and 336 of the casting 338. The shaft 362 projects forwardly into the hand and wrist pronation joint 24 and carries a gear portion 364 which meshes with a ring gear 366 supported in anti-friction bearings 368 (Fig. 18) mounted within the ring member 139, and this latter ring gear 366 is secured as at 370 (Fig. 21) to the main casting or framework 371 of the wrist assembly 14 of the electrical arm. The ring member 139 which constitutes a part of the forearm framework 50 is threaded as at 372 and receives thereon a threaded cap member 374 in the form of a ring which serves to maintain the anti-friction bearing assembly 368 in assembled position. A rubber insert or gasket 375 is interposed between the two ring members 374 and 139 and affords an effective seal against the introduction of dirt or moisture into the wrist joint 24.

From the above description it will be seen that upon engagement of the clutch assembly 146 and rotation of the driven element 154 thereof in either direction, a drive will exist through the shaft 152, flexible coupling 330, shaft 332, bevel gears 350, 352, shaft 354, worm 358, worm wheel 360, shaft 362 and gear portion 364 to rotate the ring gear 366 and, consequently, the wrist and hand assemblies 14 and 16 in one direction or the other.

THE HAND FLEXION GEAR TRAIN

Referring now to Figs. 4, 5, 6, 20 and 21, the clutch assembly 150 is the one which controls the hand flexing movements. As shown in Fig. 6, the shaft 152 of this latter assembly is coupled through a flexible joint 380 to a shaft 382 rotatably journaled between the side members 334, 336. A gear 384 mounted on the shaft 382 meshes with a similar gear 386 mounted on a shaft 388 likewise journaled between the side members 334, 336. The shaft 388 carries an additional gear 390 which meshes with a gear 392 mounted on a rotatable sleeve 394, one end of which is rotatably journaled in the side member 334, and the other end of which is rotatably journaled in the wrist section framework 371. The tubular sleeve 394 is formed with a gear 398 thereon which meshes with a gear 400 journaled on a shaft 402 supported in the framework 371 and the shaft 402 carries a worm 404 thereon meshing with a worm wheel 406 mounted on a shaft 408 also journaled in the framework. The shaft 408 carries a worm 410 meshing with a gear segment 412 which is secured as at 414 to a frame member 416 which constitutes the framework of the palm portion 28 (Fig. 4) of the electrical arm.

The frame 416 is of irregular design and includes a pair of generally parallel extending side portions 418 and 420 connected together by a reinforcing web 422. The side portions 418 and 420 carry anti-friction bearings 424 by means of which it is pivotally mounted on a transverse shaft 426, the ends of which are journaled in a pair of forwardly extending ears 428 integrally formed with the wrist casting 371. It will be seen, therefore, that when the clutch assembly 150 is engaged and the driven element 154 thereof is rotated in either direction, motion will be imparted from the shaft 152 through the flexible joint 380, gears 384, 386, 390 and 392, sleeve 394, gears 398, 400, worm 404, worm wheel 406, worm 410 and gear segment 412 to swing the frame 416 relative to the wrist section casting 371 and thus cause hand and wrist flexion. From the above operation of parts it will be seen that the worm and gear assembly, including the worms 404, 410 and worm wheel 406, affords a self-locking mechanism inasmuch as a large gear reduction ratio between the clutch element 154 and the gear segment 412 is provided. This gear ratio is sufficiently high so as to prevent countertorque applied to the gear segment 412 which may be in the form of a load on the hand section from backing up through the various gear drive instrumentalities to the clutch mechanism when the latter is disengaged.

THE MAJOR FINGER GROUP DRIVING GEAR TRAIN

Referring now to Figs. 4, 5, 6, 20, 21 and 24, the clutch assembly 148 is the one which operates to effect finger movements. As has been stated previously, the index and middle fingers 38 and 40 are separately molded but are movable in unison and constitute a major finger group which opposes the thumb 30. The palm portion 28 of the hand includes the previously mentioned two-piece separate cosmetic shell 58, 59, which is secured by means of screws 432 to the frame 416. Each of the two fingers 38 and 40 of the major group includes a cosmetic exterior or shell 434 which is pivotally mounted on the pintle pin or shaft 42 which constitutes the pivotal connection previously referred to in connection with Fig. 4 and which extends across the framework 416.

A U-shaped member 438 (Figs. 20 and 24) is provided with forwardly extending arms 440 which extend into the fingers and which are turned laterally as at 441 and bear against the inner surfaces of the shell 434 thereof. The arms 440 are pivoted for swinging movement on the pin 42. A filling material 436 preferably formed of resilient cellulose acetate foam is packed within the shell 434 and serves to maintain the arm 440 located within the shell so that it bears against the palmar portion of the latter.

An arm 442 extends rearwardly from the base of the U-shaped member 438 and constitutes a gear sector designed for engagement with a similar sector 444 mounted on a sleeve 446 which in turn is rotatably disposed on a shaft 448 extending across the framework 416. Turning movement of the sleeve 446 under the control of the clutch assembly 148 (Fig. 6) is made possible by a gear train leading from the shaft 152 of this latter clutch assembly and which extends through a pair of meshing gears 450, 452, a flexible coupling 454 and the finger drive shaft 456 which passes completely through the hand flexion sleeve 394 and which carries at its forward end a bevel gear 458 forming the input element of a differential gear assembly designated in its entirety at 460 (see also Fig. 20). The differential gear assembly 460 includes a bevel gear 462 which meshes with the gear 458 and which is mounted on the shaft 426. The gear 462 meshes with a third gear 464 mounted on a shaft 465 journaled in anti-friction bearings 466 carried on the reinforcing web 422. The shaft 465 is also journaled at one end as at 470 (Fig. 20) in a stationary portion of the frame 416. The shaft 465 carries a worm 472 which meshes with a sector 474 mounted on the sleeve 446 and this sleeve, it will be remembered, carries the sector 444 which meshes with the sector 442 which projects rearwardly from the U-shaped member 438.

It will be seen that upon engagement of the clutch 148 a drive will exist through the gears 450, 452, flexible coupling 454, shaft 456, differential assembly 460, shaft 465, worm 472 and gear sectors 474, 444, 442 to the finger group 38, 40, thus causing the finger group to be swung about the axis of the shaft 436 in either direction toward or away from the thumb 30.

THE THUMB CONSTRUCTION

Referring now to Figs. 4, 5 and 24 to 28 inclusive, the pivotal connection 32 for the thumb 30 is in the form of a pintle pin which extends between a pair of upright members 476 and 478 forming a part of the framework 416 of the hand construction. The thumb 30 includes an outer unitary cosmetic shell 480 somewhat in the shape of a human thumb and having a friction grip pad 482 attached to the ball portion of the thumb and designed for cooperation with a similar pad 484 which is applied to the ball portions of the index and middle fingers 38, 40, and which spans the latter for the purpose of grasping objects therebetween. The thumb is capable of being moved from an extended position, shown in dottd lines in Fig. 24, to a retracted position shown in full lines and it is capable of being locked in this latter position. With the thumb in its extended position, the major group fingers 38, 40 are incapable of a close approach to the thumb and thus larger objects, such as a glass or tumbler, may be engaged between the resilient pads 482, 484. With the thumb in its locked retracted position, the major group of fingers and the thumb will not accommodate such large objects but they are capable of accommodating, for example, a sheet of paper, a pencil, a pen or the handle of a cup. The thumb 30 is not mechanically driven from the motor M and it must be prepositioned by the amputee using his natural hand or, if desired, by pressing the thumb structure against a solid surface to bring the thumb from its full line locked position to the broken line position shown in Fig. 24 after which, upon release thereof, it will automatically snap back under spring pressure to its dotted line extended position.

Figure 25:
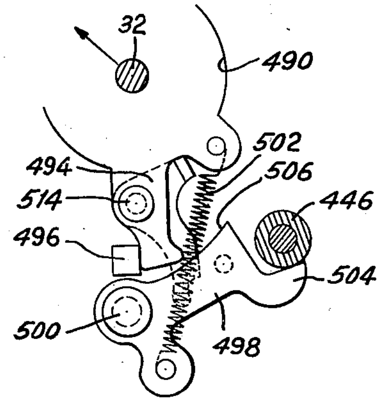

The thumb 30 includes a supporting plate 490 having a lever portion 492 which projects into the shell 480. The lever is turned laterally as at 493 and normally bears against the ball portion of the thumb on the inside thereof to exert a direct pressure on the thumb when an object is being grasped. As in the case of the major group fingers, the shell is packed with a resilient substance, such as cellulose acetate foam, which serves to maintain the lever in position. The pintle pin 32 extends through the base portion of the supporting plate 490, as well as through the shell 480 on opposite sides thereof, and thus effects a pivotal connection for the thumb. The base portion of the plate 490 is provided with a latch finger 494 (Figs. 25 to 28 inclusive) designed for engagement with a resilient limit stop 496 supported from the upright member 478 when the thumb is in its extended position, as shown in Fig. 25. A latch member 498 is pivoted as at 500 to the upright member 478 and a spring 502 connected at opposite ends to the plate 490 and latch member 498 normally biases the latter in a clockwise direction, as viewed in Fig. 25, so that the end 504 of the latch member bears against the sleeve 446 which acts as a limit stop therefor. The spring 502, in addition to urging the latch member 498 in a clockwise direction, also urges the plate 490, and consequently the entire thumb 30, in a clockwise direction, thus establishing a definite extended position for the thumb.

Figure 26:
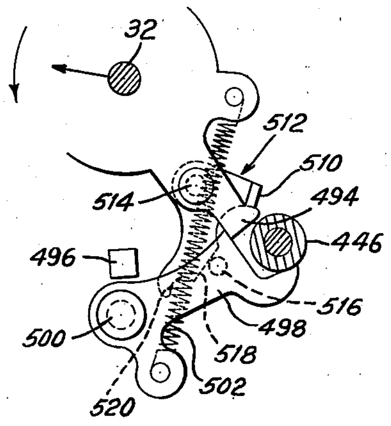
Figure 27:
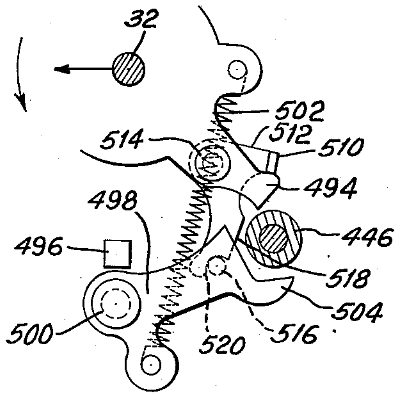
Figure 28:
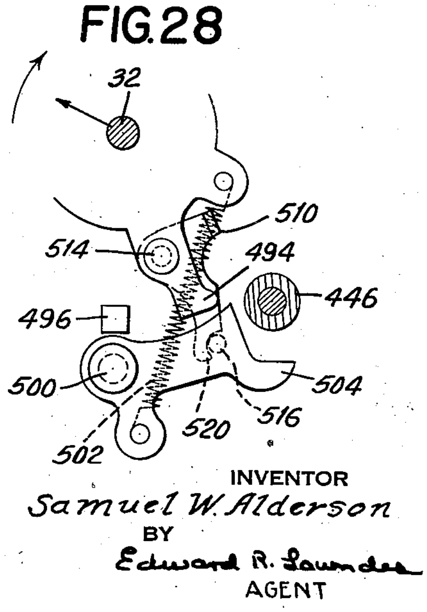

The latch member 498 is provided with a cam surface 506 designed for camming engagement with the end of the latch finger 494 so that when the finger is moved in a counterclockwise direction and clears the end of the latch member 498, the latch will snap into the position shown in Fig. 26 with the side of the finger bearing against the end of the latch member, thus locking the thumb 30 in its retracted position against movement in a clockwise direction. When it is desired to release the finger to allow it to return to its extended position, the finger is moved to the position shown in broken lines in Fig. 24 and also in Fig. 27 or, in other words, it is pressed in by the amputee toward the major group fingers 38, 40. When this is done, the end of the finger 494 bears against an inturned lug 510 formed on a trip member 512 pivoted as at 514 to the base of the latch finger 494 and the finger and trip member assembly are moved rearwardly, thus causing a pin 516 formed on the latch member 498 to ride outwardly on a cam surface 518 afforded by the trip member 512 until the same falls into a depression 520 formed in the extreme end of the trip member, as shown in Fig. 27, at which time the end of the latch finger 494 will clear the end of the latch member 498 and the plate 490 will be free to move in a clockwise direction, as shown in Fig. 28, until such time as the side of the latch finger 494 again engages the resilient limit stop 496 and the thumb 30 returns to its extended position.

THE SHOULDER HARNESS AND PELVIC SUSPENSION

Figures 2, 3:
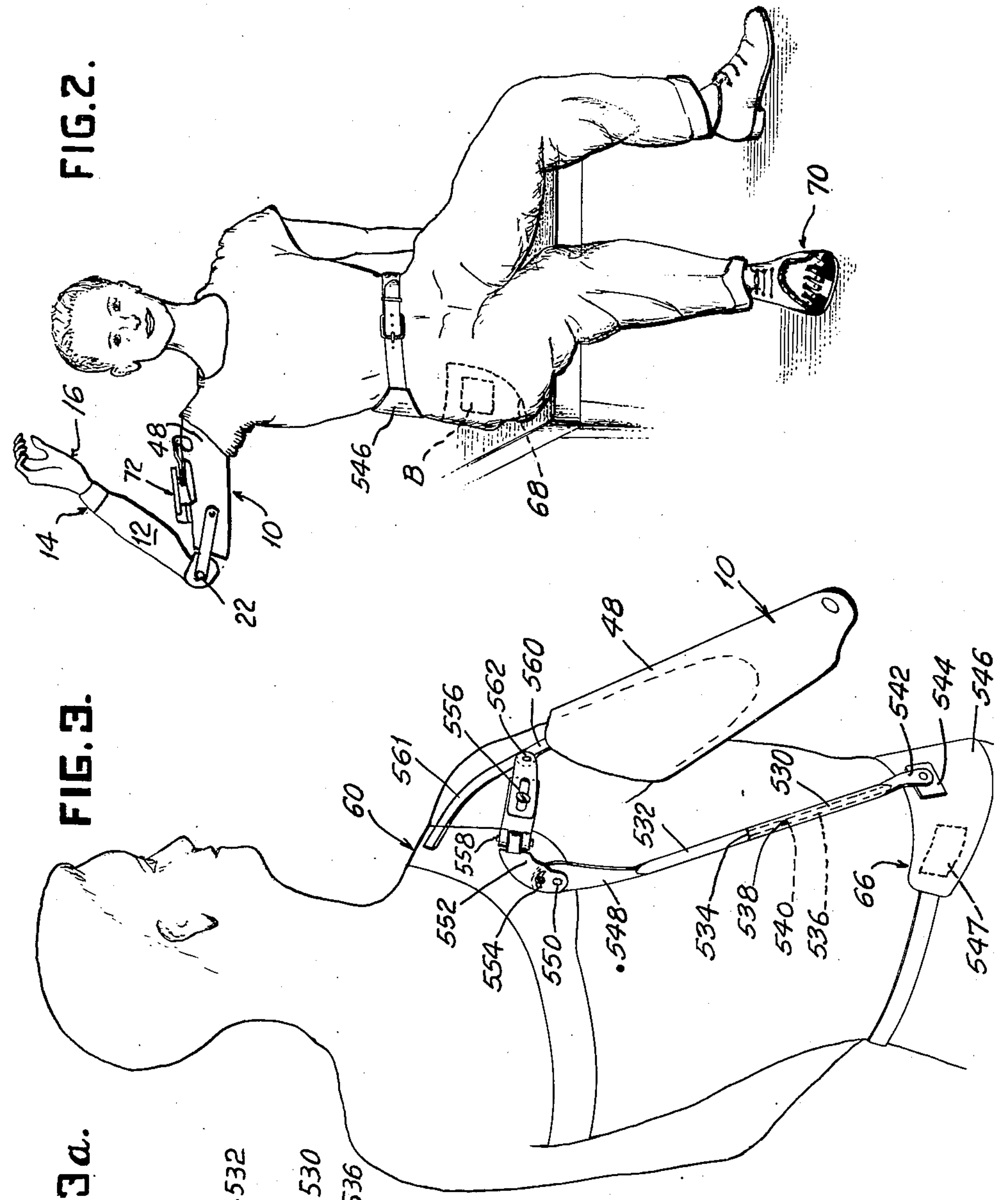
Fig. 2 is a view similar to Fig. 1 showing the amputee seated and illustrating the manner in which the movements of the arm may be controlled by manipulation of the feet. In this view, the arm is shown in a raised position.
Fig. 3 is a view similar to Figs. 1 and 2 showing the linkage between the shoulder strap and the upper arm section of the electrical arm, together with the connection between the shoulder strap and the abdominal or waist belt.

Referring now to Figs. 2 and 3, the shoulder harness 60 and pelvic suspension device 66 are worn around the body of the user, as shown in the drawings, and the semi-rigid connection therebetween includes a pair of steel tubes 530 and 532 which are butted together as at 534 over an inner rod 536, as shown in the detail drawing of Figure 3*a*. The upper tube 532 is fixedly secured to the inner rod 536 in any suitable manner, as for example, by a brazing operation, while the tube 530 is free to rotate relative to the rod 536. Extension between the two sections is prevented by means of a pin 538 which projects through the tube 530 and extends into a groove 540 formed around the inner rod 536. The lower end of the tube 530 is flattened as at 542 and is pivotally secured as at 544 to a hip plate 546 forming a part of the pelvic suspension device 66. The upper end of the tube 532 is flattened as at 548 and is pivoted as at 550 to a plate 552. A pin and slot connection 554 existing between the flattened portion 548 of the tube 532 and the plate 552 restricts the relative turning movements between these two parts. The plate 552 is suitably secured to the shoulder harness 60. The flexible connection includes a pin and slot connection 556 and this connection is hinged as at 558 to the plate 552. An attachment rod 560 is pivoted as at 562 at one end to the flexible connection and is suitably secured at its other end to the stump-receiving socket 48. A flexible strap 561 extends between the pivotal point 562 and an elevated region on the shoulder harness.

From the above description it will be seen that use of the shoulder harness 60 and pelvic suspension device 66, together with the interconnecting structure and the connecting structure between the shoulder harness and the stump-receiving socket, forms a means for distributing the weight of the electrical arm about the body of the amputee. The pivot 550 is located directly behind the shoulder blade so that when abduction of the arm from the side of the body to a horizontal position occurs, a part of the suspension moves as a unit with the upper arm. The weight of the arm, however, remains distributed between the shoulder harness 60 and pelvic suspension device 66 but in varying degrees as the increments of upward motion are performed. The extensible action of the pin and slot connection 556 permits the upper arm section to be brought around against the chest without binding at the shoulder, while at the same time allowing a portion of the weight of the arm to be supported from the shoulder and pelvic regions. The rotating tube structure 530, 532 permits relative rotation between the upper regions of the body and the medial regions thereof, which is found necessary for certain arm manipulations. The extent of rotation between the two tubes is relatively small but it has been found necessary, nevertheless, to prevent binding and consequent discomfort to the amputee.

THE ELECTRICAL INSTRUMENTALITIES

*The power supply*

The electrical instrumentalities associated with the electrical arm are the previously mentioned motor M which is supported in the elbow joint structure 20 by means of a floating connection; the distributor 214 contained in the forearm section proper 18 near the rear end thereof; the clutch selector magnet CM likewise contained within the forearm section proper 18; the battery unit B which is adapted to be maintained within the right-hand trousers pocket of the amputee; a pair of relay magnets R1 and R2 together with their operating contacts which may conveniently be supported from the hip plate 546 within a suitable container or pouch such as is shown at 547 in Fig. 3; the stump switch 72 which is supported on a bracket 564 mounted on the stump-receiving socket 48 of the upper arm structure 10; a pair of toe contacts *Sb* and *Sl* associated with an inner sole member 566 (Fig. 22) adapted to be received in one of the shoes of the user, together with electrical wiring which is conveniently distributed within the arm structure and in and about the body of the amputee in such a manner as to most effectively perform the required functions, all in a manner that will be set forth when the electrical circuits for the arm are described.

*The stump switch*

Figure 1:
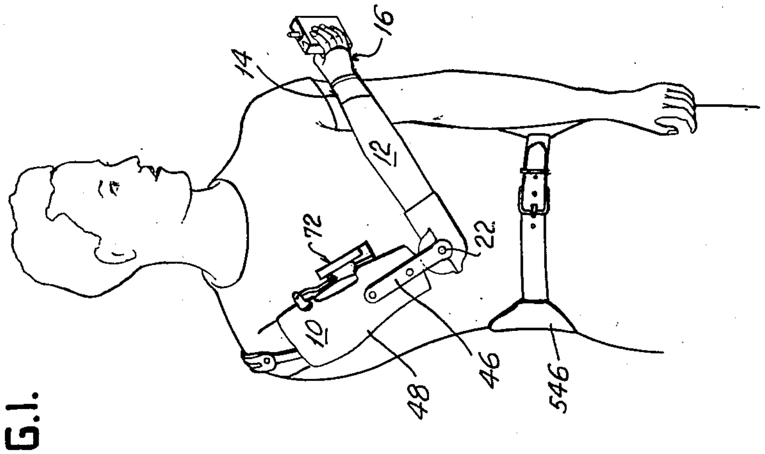
Fig. 1 is a perspective view of the electrical arm proper showing the same being worn by a right-arm amputee having an upper arm stump of substantial length and also showing the harness by means of which the arm is retained on the body of the user.

Referring now to Figs. 1, 30 and 31, the stump switch assembly 72 is suitably mounted on the bracket 564 which in turn is attached to the stump-receiving socket 48 on the inner side of the upper arm stump between the stump and the body of the amputee. The stump switch assembly 72 projects upwardly in front of an opening 575 provided in the side of the stump-receiving socket for the purpose of allowing the amputee to project his stump biceps through the opening and against a control finger 577 which is pivoted as at 579 above the opening 575 and which depends downwardly in front of the opening to selectively manipulate a series of contacts associated with the stump switch. An operating finger 581 is associated with the switch assembly 72 and is positioned in the path of movement of the control finger 577.

In Fig. 31 it will be seen that three sets of contacts labeled 1, 2 and 3 are associated with the stump switch assembly 72. Contact 1 is normally maintained open but is adapted to become immediately closed upon any projection of the stump biceps whatsoever. Contacts 2 and 3 are each of the single pole double throw type which normally assume the position shown in Fig. 31.

In the full line position of the stump biceps the contacts 1 are open and the contacts 2 and 3 assume their normal positions. In the dotted line position of the biceps the contacts 1 become closed, while the contacts 2 and 3 still remain in their normal position. With the biceps in its broken line position the contacts 1 remain closed, while the contacts 2 and 3 both become reversed. As will be pointed out when the circuit diagram of Fig. 31 is explained, the contacts 1 when closed effect energization of a circuit leading through the motor M to energize the motor and cause the same to operate in one direction. With the contacts 1 closed and the contacts 2 and 3 reversed, the motor circuit will still be energized but with current of reverse polarity, thus causing the motor to run in the opposite direction and reverse the character of movement selected for the artificial arm by the use of a pair of toe switches contained in the shoe of the amputee, whose nature and function will be described subsequently.

*The toe contacts*

Referring now to Figs. 22, 23 and 31 wherein the construction of the toe contacts *Sb* and *Sl* is shown, these contacts are associated with a specially constructed inner sole 566 which is adapted to fit into the shoe 70 of the user and which is preferably of a waterproof construction. On the upper surface of the sole 566 there is disposed a flexible contact plate 568 which is riveted as at 570 through the sole to a conducting plate 572 disposed on the underneath side of the sole and which leads to a terminal point 574. The conducting plate 572 constitutes a common electrical connection for both the contacts *Sb* and *Sl*. The plate 568 is adapted to underlie the five toes of the amputee and immediately under the position normally occupied by the big toe a contact plug 576 is provided. A similar contact plug 578 is provided for the little toe. These contact plugs project downwardly from the contact plate 568 to which they are electrically attached and extend through small openings 580 provided in the sole 566. The contact plug 576 is designed for electrical contact with a conducting plate 582 disposed on the underneath side of the sole, while the contact plug 578 is designed for contact with a conducting plate 584 likewise disposed on the underneath side of the sole. The three conducting plates 572, 582 and 584 may be secured in place by means of rivets or the like 586. The terminals of the conducting plates 582 and 584 are shown at 590 and 592 respectively and they are disposed in the vicinity of the terminal 574. The contact plate 568 is bowed upwardly so that the contact plugs 576 and 578 normally remain out of contact with their respective conducting plates 582 and 584. The contacts *Sb* and *Sl*, therefore, are the normally open type and may selectively be closed by the application of pressure of the big toe, the little toe or both toes at the will of the amputee. An over-all cover 594 of a waterproof nature for the sole 566 may be provided to completely enclose the various electrical instrumentalities associated with the toe contact assembly. This cover 574 is, of course, formed of insulating material to effectively electrically isolate the skin from contact with the metallic conducting parts of the contact assembly.

THE ELECTRICAL CIRCUITS

*The motor circuit*

Referring now to Fig. 31 wherein the circuit diagram for the electrical arm is shown, initial manipulation of the stump switch 72 by a partial extension of the stump biceps serves to close the 1 contacts of this switch while allowing the 2 and 3 contacts thereof to maintain their normal positions as shown. Thus a circuit will be established from the positive side of the battery B through a master switch S*m*, 1 contacts of the stump switch 72, 2 contacts (normal), wires *a, b, c, d*, motor M, wires *e, f*, 3 contacts of the switch 72 (normal), and wire *g* to the negative side of the battery. Completion of this circuit serves to energize the motor M and, since this motor is of the reversible type and the current passes through the field coil winding thereof in a predetermined direction, the motor shaft will commence to rotate in a corresponding direction to obtain forward movement for the selected type of operation of the electrical arm.

*Contact selection*

The initial effect of closing the 1 contacts of the stump switch 72 is to cause the motor to run in the desired direction and thereafter selection of one of the four clutches 144, 146, 148 or 150 associated with the clutch assembly is made according to the type of control desired by the amputee and evidenced by his manipulation of the toe contacts S*b* and S*l*. The following table will illustrate the manner in which the four possible types of control may be attained:

| Type of control | Toe contact operation | Relay operation |
|---|---|---|
| Finger Manipulation | S*b* open, S*l* open | R1 deenergized, R2 deenergized. |
| Hand and Wrist Pronation. | S*b* open, S*l* closed | R1 deenergized, R2 energized. |
| Elbow Flexion | S*b* closed, S*l* open | R1 energized, R2 deenergized. |
| Hand Flexion | S*b* closed, S*l* closed | R1 energized, R2 energized. |

*Finger manipulation*

If it is assumed that the major group of fingers 38, 40 are to become closed upon the thumb 30, neither of the contacts S*b* or S*l* will be closed. This condition will be attained by the simple expedient of the amputee maintaining both his big toe and his little toe elevated. Under such conditions, after closure of the 1 contacts of the stump switch 72 a circuit will exist in parallel with the motor circuit from the battery B through the master switch S*m*, 1 contacts of the stump switch 72, 2 contacts (normal), wires *a, b, c, h*, magnet CM, wire *i* to the common inner distributor ring 220 of the distributor 214 and from thence to the rotary brush 212 which, being mounted upon the shaft 180 (see Figs. 10 and 11) commenced to rotate immediately upon energization of the motor M. Depending upon the position of the brush 212, the latter will sense the four segments 222 of the distributor 214 and seek a path through each segment to the negative side of the battery. In the present instance, the only labyrinth circuit leading from the brush 212 to the negative side of the battery exists through the segment labeled "Finger Control." As soon as the brush 212 makes its sensing engagement with this segment, a circuit will be completed from the segment to the negative side of the battery through wire *j*, 1 contacts of the relay magnet R2 (normal by virtue of non-energization of the magnet R2), 1 contacts of the relay magnet R1 (normal by virtue of non-energization of the magnet R1), wires *k, l, f*, 3 contacts of the switch 72 (normal), and wire *g* to the negative side of the line.

As soon as the above described circuit is completed the magnet CM becomes energized since it is disposed within this circuit and the core 246 (Fig. 8) is attracted, thus swinging the yoke 234 in a clockwise direction and moving the shaft 180 to the left so that the clutch assembly 188 becomes open and the friction surfaces 191, 193 bear against each other and stop the rotation of the shaft 180. This motion-stopping action is substantially instantaneous, occurring as it does before the comparatively wide clutch actuating finger 178 (Fig. 11) passes the selected bearing ball 176. The selected bearing ball, i. e., the one which is associated with the clutch assembly 148 (Fig. 6), is moved in a forward direction relative to the forearm section and the two elements 154, 158 of the clutch assembly 148 are engaged, thus causing the major finger group 38, 40 to close upon the thumb 30. The circuit leading through this finger control segment 222 will remain in effect as long as the toe contacts S*b* and S*l* remain open and the stump switch 72 remains in the position to which it is initially moved with the 1 contacts closed and the contacts 2 and 3 remaining in their normal position.

If it is desired to reverse the finger movement and move the major group 38, 40 away from the thumb 30, the toes of the amputee remain elevated and, consequently, the toe contacts S*b* and S*l* remain open. By further dilation of the stump biceps the 2 and 3 contacts of the stump switch 72 are reversed while the 1 contacts remain closed. A circuit then exists from the battery B through the master switch S*m*, 1 contacts of the stump switch 72, 2 contacts (reversed), wires *m, f, e*, motor M, wires *d, c, b, n*, 3 contacts of the switch 72 (reversed), and wire *g* to the negative side of the line. Evidence of this last mentioned circuit will send current of reverse polarity through the motor M, thus operating the same in a reverse direction to cause opening movements of the fingers. The circuit employed for selecting the proper clutch to operate the fingers in the reverse direction is the same identical circuit described for causing closing of the fingers.

*Hand and wrist pronation*

For effecting hand and wrist pronation in either direction the motor circuit remains the same and a description thereof is believed to be unnecessary. To effect hand and wrist pronation the little toe is depressed, thus closing the contact S*l* and establishing a circuit from the battery B through the master switch S*m*, 1 contacts of the switch 72, 2 contacts (normal), wires *a, b, o, p*, magnet R2, wire *q*, contact S*l*, plate 568, wires *r, l, f*, 3 contacts of the switch 72 (normal), and wire *g* to the source. Energization of the magnet R2 causes reversal of the 2 contacts thereof thus connecting the hand and wrist pronation segment 222 to the negative side of the battery through a circuit which exists from this segment through wire *s*, 1 contacts of the magnet R2 (reversed), 1 contacts of the magnet R1 (normal), wires *k, l, f*, 3 contacts of the switch 72, and wire *g* to the battery B. It is obvious that when the direction of rotation of the motor shaft is reversed, hand and wrist pronation in the opposite direction will occur.

*Elbow flexion*

For elbow flexion the big toe is depressed to close the contact S*b* and establish a circuit through the magnet R1 leading from the battery B through the master switch S*m*, 1 contacts of the switch 72, 2 contacts (normal), wires *a, b, o, t*, magnet R1, wire *u*, contact S*b*, wires *r, l, f*, 3 contacts of the switch 72 and wire *g* to the battery B. Obviously elbow flexion in either direction will involve the same circuit by a reversal of the motor M.

Upon energization of the magnet R1 a circuit will exist from the elbow flexion segment through wire *v*, 2 contacts of the magnet R2 (normal), 1 contacts of the magnet R1 (reversed), wires *k*, *l*, *f*, 3 contacts of the switch 72, and wire *g* to the battery.

*Hand flexion*

For hand flexion purposes, both the big toe and the little toe are depressed to close the contacts S*b* and S*l* and energize both the magnets R1 and R2 through circuits previously described. Upon energization of these two magnets, a potential circuit will exist from the hand flexion segment 222 through wire *w*, 2 contacts of the magnet R2 (reversed), 1 contacts of the magnet R1 (reversed), wires *k*, *l*, *f*, 3 contacts of the switch 72 (normal), wire *g* to the battery. Reversal of the hand flexing operation is, of course, obtained through the same circuit with the polarity of the motor M reversed.

ELECTRICALLY OPERATED ARM FOR EXTREME CASE AMPUTEES

An extreme case amputee is herein defined as one having disarticulation of a portion of the shoulder or one having a stump which is not able to lift or guide the electrical artificial arm. Usually, such a stump will be very short, although occasionally it may be of material length but with impaired muscular function.

Referring now to Figs. 32, 33 and 34, the amputee is illustrated as being possessed of an extremely short stump which is incapable of sufficient muscular function to lift and guide the artificial arm proper. The upper arm structure of the artificial arm is designated at 600 while the elbow joint structure is shown at 602. It will be understood that the elbow joint structure, as well as the forearm section, the wrist section and the hand section, including the fingers, are substantially identical with the corresponding sections 20, 12, 14, 16 previously described in connection with the other form of the invention designed for use by amputees having a muscularly active stump. The manner of suspending the elbow joint structure 602 from the shoulder or stump in the modified form of the invention constitutes the sole departure from the other form of the invention. To accomplish this, a modified form of upper arm structure 600 has been designed.

The upper arm structure 600 in the modified form of the invention includes a substantially U-shaped pendulous frame 604 having parallel arms 606 and 608 corresponding in function to the members 44 and 46 in the other form of the invention. The frame member 604 is pivoted to and suspended from a pendulous U-shaped bracket or cradle 610 and is adapted to be releasably locked in any desired position of angularity relative to the bracket 610 to permit lateral swinging movements of the forearm when the latter is raised, all in a manner that will be made clear presently.

Toward these ends, the upper end of a sleeve 612 is secured in the base 614 of the inverted U-shaped frame 604 and depends downwardly therefrom. The lower end of the sleeve 612 extends into and is journaled as at 616 in an inverted U-shaped cross piece 618 which spans the arms 606 and 608. A lock shaft 620 extends completely through the sleeve 612 and through the base 622 of the U-shaped bracket 610 and carries at its upper end a locking disc 624 having a series of downwardly facing teeth 626 designed for meshing engagement with a similar series of teeth 628 formed on the upper surface of the base 622. A coil spring 630 surrounding the shaft 620 bears at its upper end against the sleeve 612 and at its lower end against a guide bar 632 carried adjacent the lower end of the shaft 620. The spring 630 therefore normally urges the shaft 620 downwardly so as to cause the teeth 626 and 628 to normally mesh with each other. The guide bar 632 is secured to the shaft 620 and its opposite ends extend into guideways 636 formed in the ends of the cross member 618 and thus the shaft 620 and disc 624 are constrained to follow the angular movements of the upper arm structure 600.

The lower end of the shaft 620 carries a roller 638 designed for engagement with an abutment 640 positioned on the cover plate 642 of the elbow joint structure 602 when the forearm attains a predetermined degree of angularity relative to the frame 604. The abutment 640 is adapted to engage the roller 638 when the angle between the forearm structure and the frame 604 exceeds approximately 50°, although it will be understood, of course, that the abutment 640 may be variably positioned on the cover plate 642 to cause coaction between the abutment 640 and roller 638 at any desired angle between the forearm and frame.

The U-shaped bracket 610 is pivotally suspended by means of trunnions 644 from a stump- or shoulder-cap 646 adapted in the case of an amputee having a short stump to fit thereover or, in the case of an amputee having no stump, to fit directly on the shoulder portion of the body. Each arm of the U-shaped bracket 610 has hinged thereto as at 652 a plate 654 of generally L-shaped design. The hinged connections 652 are spring pressed as at 656 in such a manner as to cause the plates 654 to normally lie flush with the body of the amputee. A cord 658, preferably formed of nylon or other relatively strong, wear-resistant material, has its opposite ends secured to the plates 654 and the medial regions of the cord pass around a pulley 660 (Fig. 34) carried on a shaft 662 which extends between a pair of spaced plates 666 which are maintained in spaced parallelism by means of spacing members 668.

A gripping device 670 generally in the form of a lazy tongs includes a pair of gripping jaws 672 carried on the inner sides of a pair of arms 674, the lower ends of which are pivoted to a pair of toggle arms 676 piovted together as at 678. A spring 680 serves to maintain the lazy tongs structure in such a position that the jaws 672 thereof are disengaged from the cord 658. An attachment member 682 is connected to the pivotal point 678 and is secured to a waist belt or groin strap 684 adapted to be worn by the amputee.

It will be seen that with the shoulder of the amputee lowered, the cord 658 will be slack, and, as a consequence, the spring 680 will tend to collapse the lazy tongs structure so that the jaws 672 free the cord 658. In this position the upper arm structure 600 may swing forwardly and rearwardly in accordance with the natural gait of the amputee while walking.

Inasmuch as the extreme case amputee either has no upper arm stump or is possessed of a stump having impaired muscular function, it is obvious that under ordinary circumstances without the use of the lazy tongs locking device it would be difficult, if not impossible, for him to maintain the upper arm section 600 vertical with the forearm section extending forwardly at right angles thereto. The center of mass of the entire artificial arm being well forward of the body of the amputee, the tendency for the pendulously supported arm would be to assume a position relative to the body of the amputee with the elbow joint at right angles but with the forearm inclined forwardly and downwardly or, in other words, with the hand below the level of the elbow. When utilizing the lazy tongs lock, in order to attain a horizontal position of the forearm it is merely necessary for the amputee to elevate his shoulder sufficiently to lock the lazy tongs device with the upper arm 600 in its normal vertical position, after which he may manipulate the controls to bring the forearm up to a forwardly extending horizontal position. The weight of the forearm and hand sections will then be supported from the cord and the desired position of the artificial arm will have been attained.

The cord 658 also permits the amputee to swing the upper arm section 600 outwardly laterally away from the body. When the amputee raises his shoulder beyond the level required to lock the lazy tongs device, the cord 658 will become taut and the plates 654 will be moved or pulled in a clockwise direction, as viewed in Fig. 32, thus swinging the U-shaped bracket 610 outwardly away from the body of the user and causing the upper arm section 600 to likewise be moved outwardly.

These dual functions of the locking lazy tongs and cord structure may be performed without interfering with each other and a wide variety of arm motions and positions are attainable, all within the skill and experience of the amputee.

To effect rapid swinging movement about a vertical axis of the forearm structure it is merely necessary for the amputee to effect elbow flexion to such a degree that the abutment 640 engages the roller 638 to move the shaft 620 upwardly and permit disengagement between the teeth 626 and 628 on the disc 624 and base portion 622 respectively. With these teeth disengaged, the amputee may swing the forearm structure in either direction, after which, upon lowering of the forearm structure and disengagement between the abutment 640 and the roller 638, the forearm structure will become locked relative to the upper arm structure 600.

*Electrical controls and circuits for extreme case amputees*

Obviously, since an extreme case amputee is devoid of a biceps for actuating a stump switch of the type shown at 72 in the other form of the invention, a different set of electrical controls must be employed for performing the functions of the stump switch, i. e., for initiating motor energization and effecting reversal of the motor when desired. Such an electrical control may be designed for use by movement of various anatomical parts of the amputee's body but it is preferred that an inner sole contact mechanism similar to that employed in the right shoe 70 in the other form of the invention be installed in the left shoe (not shown) of the amputee.

In Fig. 35 such a contact mechanism is shown. This contact mechanism is similar to the mechanism shown in Fig. 2 and includes an inner sole element 700 which is adapted to fit into the left shoe of the user and which is of a water-proof insulating nature. On the upper surface of the sole 700 there is disposed a flexible contact plate 702 which is riveted as at 704 through the sole to a conducting plate 706 which leads to a terminal point 708. The conducting plate 706 constitutes a common electrical connection for a big toe contact S'*b* and a little toe contact S'*l* similar to the contacts S*b* and S*l*. A contact plug 710 is adapted to underlie the big toe and projects through the sole 700 and is designed for electrical contact with a conducting plate 712 disposed on the underneath side of the sole and leading to a terminal point 714. A conducting plug 716 is adapted to underlie the little toe and projects through the sole 700 and is designed for electrical contact with a conducting plate 718 leading to a terminal point 720. The mechanical structure of the toe contact assembly of Fig. 35 and its mode of operation is similar to the structure and operation of the toe contact assembly shown in Fig. 22 and a further description thereof is, therefore, believed to be unecessary. The function of the contact assembly of Fig. 35 will be set forth in connection with the circuit diagram of Fig. 36 now to be fully described.

The contacts S'*b* and S'*l* serve to control initial energization of the electric motor M of the electrical arm and also to control the direction of rotation of the motor shaft and, toward this end, there is associated with these contacts a relay magnet R3 (Fig. 36) whose 1 and 2 contacts operate upon reversal thereof to reverse the direction of rotation of the motor M. The relay magnet R3, together with its contacts, may be housed in the same relay pouch 547 (see Fig. 3) with the relay magnets R1 and R2.

The circuit diagram of Fig. 36 is substantially identical with the circuit diagram of Fig. 31 except for the fact that the toe contact assembly 722 has been substituted for the stump switch assembly 72 and for the fact that the additional relay magnet R3, together with its contacts, has been included in the hip plate pouch 547 of Fig. 3. The wire designations, as well as the designations of the electrical and mechanical devices of Fig. 31, have been preserved in applying reference characters to Fig. 36 and, as a consequence, a detailed description of the operation of the electrical arm in regard to hand flexion, elbow flexion, hand and wrist pronation, finger control, etc., is believed to be unnecessary.

The extreme case amputee may select the type of control he desires by means of the contacts S*l* and S*b* associated with the right foot inner sole assembly 566 and he may initiate and reverse such movements of the arm by means of the contacts S'*l* and S'*b* associated with the left foot inner sole assembly 722. If it is assumed that a particular type of control, for example, hand flexion, has been selected by depression of both the big and little toes of the right foot to close the contacts S*b* and S*l*, depression of the little toe of the right foot will serve to close the contacts S'*l* and initiate the desired movement by energization of the motor M. The circuit exists from the battery B through the master switch S*m*, contacts S'*l*, 2 contacts of the relay magnet R3, (normal), wire *e*, motor M, wires *d*, *c*, *b*, 1 contacts of the relay R1 (normal), and wire *g* to the battery. The motor will thus run in one direction and the hand will be flexed relative to the wrist in a corresponding direction.

If it is desired to flex the hand in the opposite direction, the big toe, in addition to the little toe, is depressed. This causes energization of the relay magnet R3 through a circuit leading from the battery, through the master switch S*m*, contacts S'*l*, S'*b*, relay magnet R3, and the wire *g* to the battery. Energization of the magnet R3 causes reversal of its 1 and 2 contacts and a circuit then exists from the battery through the switch S*m*, contacts S'*l*, 2 contacts of the magnet R3 (reversed), wires *b*, *c*, *d*, motor M, wire *e*, 1 contacts of the magnet R3 (reversed), and wire *g* to the source. Since current passing through the field of the motor M is thus reversed, a reversal of the selected type of artificial arm motion is attained.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An artificial limb for amputees comprising in combination an upper arm section, a forearm section, a wrist section and a hand section, the latter including a pair of finger portions, at least one of said finger portions being pivoted to the hand section for independent movement toward and away from the other, an elbow joint pivotally connecting said upper arm section and forearm section for elbow flexing movements, a pronation joint pivotally connecting said wrist section and forearm section for permitting hand and wrist pronation movements in either direction, a hand flexion joint pivotally connecting said hand and wrist section for permitting hand flexing movements, an electric motor carried by one of said sections and movable bodily therewith, driving connections leading from said motor to said elbow joint, pronation joint, hand flexing joint and to the individually movable finger portions of the hand section, said driving connections serving to effect elbow flexion, hand and wrist pronation, hand flexion and relative finger movements respectively, means normally disconnecting said driving connections from the motor, means under the control of the amputee for energizing said motor, and selective clutch means also operable under the control of the amputee for selectively connecting said driving connection to the motor.

2. An artificial limb for amputees comprising in combination an upper arm section, a forearm section, a wrist section and a hand section, the latter including a pair of finger portions, at least one of said finger portions being pivoted to the hand section for independent movement toward and away from the other, an elbow joint pivotally connecting said upper arm section and forearm section for elbow flexing movements, a pronation joint pivotally connecting said wrist section and forearm section for permitting hand and wrist pronation movements in either direction, a hand flexion joint pivotally connecting said hand and wrist section for permitting hand flexing movements, an electric motor carried by one of said sections and movable bodily therewith, driving connections leading from said motor to said elbow joint, pronation joint, hand flexing joint and to the individually movable finger portions of the hand section, said driving connections serving to effect elbow flexion, hand and wrist pronation, hand flexion and relative finger movements respectively, means normally disconnecting said driving connections from the motor, means under the control of the amputee for energizing said motor, and selective clutch means also operable under the control of the amputee for selectively connecting said driving connections to the motor, each to the exclusion of the other.

3. An artificial limb for amputees comprising, in combination, a forearm section, a wrist section and a hand section, the latter including a pair of finger portions, at least one of said finger portions being pivoted to the hand section for independent movement toward and away from the other, a pronation joint pivotally connecting said wrist section and forearm section for permitting hand and wrist pronation movements in either direction, a hand flexion joint pivotally connecting said hand and wrist sections for permitting hand flexing movements, an electric motor carried by said forearm section, driving connections leading from said motor to said pronation joint, hand flexion joint and to the individually movable finger portions of the hand section, said driving connections serving to effect hand and wrist pronation, hand flexion and relative finger movements respectively, means normally disconnecting said driving connections from the motor, means under the control of the amputee for energizing said motor, and selective clutch means also operable under the control of the amputee for selectively connecting said driving connections to the motor.

4. An artificial limb for amputees comprising, in combination, a forearm section, a wrist section and a hand section, the latter including a pair of finger portions, at least one of said finger portions being pivoted to the hand section for independent movement toward and away from the other, a pronation joint pivotally connecting said wrist section and forearm section for permitting hand and wrist pronation movements in either direction, a hand flexion joint pivotally connecting said hand and wrist sections for permitting hand flexing movements, an electric motor carried by said forearm section, driving connections leading from said motor to said pronation joint, hand flexion joint and to the individually movable finger portions of the hand section, said driving connections serving to effect hand and wrist pronation, hand flexion and relative finger movements respectively, means normally disconnecting said driving connections from the motor, means under the control of the amputee for energizing said motor, and selective clutch means also operable under the control of the amputee for selectively connecting said driving connections to the motor, each to the exclusion of the other.

5. An artificial limb for amputees comprising, in combination, a forearm section, a wrist section and a hand section, a pronation joint pivotally connecting said wrist section and said forearm section for permitting hand and wrist pronation movements in either direction, a hand flexion joint pivotally connecting said hand and wrist sections for permitting hand flexing movements, an electric motor carried by said forearm section, driving connections leading from the motor to said pronation joint and hand flexion joint, said driving connections serving to permit hand and wrist pronation and hand flexing movements, means normally disconnecting said driving connections from the motor, means under the control of the amputee for energizing said motor, and selective clutch means also operable under the control of the amputee for selectively connecting said driving connections to the motor.

6. An artificial limb for amputees comprising, in combination, a forearm section, a wrist section and a hand section, a pronation joint pivotally connecting said wrist section and said forearm section for permitting hand and wrist pronation movements in either direction, a hand flexion joint pivotally connecting said hand and wrist sections for permitting hand flexing movements, an electric motor carried by said forearm section, driving connections leading from the motor to said pronation joint and hand flexion joint, said driving connections serving to permit hand and wrist pronation and hand flexing movements, means normally disconnecting said driving connections from the motor, means under the control of the amputee for energizing said motor, and selective clutch means also operable under the control of the amputee for selectively connecting said driving connections to the motor each to the exclusion of the other.

7. The combination with an electrically powered artificial arm having an upper arm stump-receiving socket provided with an opening therein in register with the biceps muscle of the amputee, of electrical control means for said arm in the form of a switch assembly fixedly secured to said stum-receiving socket, said switch assembly including an operating finger positioned in register with said opening and in the path of movement of said biceps muscle when the latter is dilated from its normal to an extended position.

8. An artificial limb for amputees comprising, in combination, a forearm section, a wrist section, and a hand section, a pronation joint pivotally connecting said wrist section and said forearm section for permitting hand and wrist pronation movements in either direction, a hand flexion joint pivotally connecting said hand and wrist sections for permitting hand flexing movements, an electric motor carried by said forearm section, driving connections leading from the motor to said pronation joint and hand flexion joint, said driving connections serving to permit hand and wrist pronation and hand flexing movements, means normally disconnecting said driving connections from the motor, means under the control of the amputee for energizing said motor, and selective clutch means also operable under the control of the amputee for selectively connecting said driving connections to the motor, each of said driving connections including a high gear ratio worm and gear reduction assembly whereby counter torque applied to the hand or wrist section opposing hand flexion or hand and wrist pronation movements will not be applied through said driving connections to said selective clutch means.

9. An artificial limb for amputees comprising, in combination, a forearm section, a wrist section and a hand section, the latter including a pair of finger portions, at least one of said finger portions being pivoted to the hand section for independent movement toward and away from the other, a pronation joint pivotally connecting said wrist section and forearm section for permitting hand and wrist pronation movements in either direction, a hand flexion joint pivotally connecting said hand and wrist sections for permitting hand flexing movements, an electric motor carried by said forearm section, driving connections leading from said motor to said pronation joint, hand flexion joint and to the individually movable finger portions of the hand section, said driving connections serving to effect hand and wrist pronation, hand flexion and relative finger movements respectively, means normally disconnecting said driving connections from the motor, means under the control of the amputee for energizing said motor, and selective clutch means also operable under the control of the amputee for selectively connecting said driving connections to the motor, each of said driving connections including a high gear ratio worm and gear reduction assembly whereby counter torque applied to the hand section, wrist section or finger portions opposing hand flexion, hand and wrist pronation and finger movements will not be applied through said driving connections to said selective clutch means.

10. An electrically powered artificial arm for amputees comprising an upper arm section for receiving the stump of an amputated arm, a forearm section hingedly secured at one extremity to the said upper arm section, a wrist section pivotally secured at one extremity to the other extremity of the said forearm section, and a hand section hingedly secured to the other extremity of the said wrist section; an electric motor upon one of the said arm sections; a plurality of driving connections from the said motor, one connection to each of the said sections; the said connections being operative respectively to effect flexion of the said forearm section, pronation of the said wrist section, and flexion of the said hand section; a clutch selectively operable to engage each of the said connections with the said motor; electromagnetic means for operating the said clutch; and a source of electrical energy for actuating the said motor.

11. The invention set forth in claim 10 with the further provision of a switch upon the said upper arm section operable by the tensioning of the muscles of the said stump for interrupting the said source of electrical energy.

12. The invention set forth in claim 11 including the further provision of circuit connections to the said electromagnetic clutch means including a control switch, the said control switch being adapted to be operated by an anatomical portion of an amputee's body.

13. An electrically powered artificial arm for amputees comprising an upper arm section for receiving the stump of an amputated arm, a forearm section hingedly secured at one extremity to the said upper arm section, a wrist section pivotally secured at one extermity to the other extremity of the said forearm section, and a hand section hingedly secured to the other extremity of the said wrist section; an electric motor upon one of the said arm sections; a plurality of driving connections from the said motor, one connection to each of the said sections; the said connections being operative respectively to effect flexion of the said forearm section, pronation of the said wrist section, and flexion of the said hand section; a clutch selectively operable to engage each of the said connections with the said motor; electromagnetic means for operating the said clutch; and a source of electrical energy for actuating the said motor, with the further inclusion of a major finger group and a minor finger group in the said hand section, the said major group including a semi-fixed thumb member, a movable index finger member, and a movable middle finger member, a driving connection from the said motor to the said major finger group, the said connection being operable to bring about a movement of one or more of the said finger members.

14. The invention according to claim 13 with the further inclusion of means for reversibly operating the said electric motor, the said means including an electrical switch adapted to be operated by an anatomical portion of an amputee's body.

15. The invention of claim 14 further modified by the inclusion of a hinge for one of the finger members whereby the operation of the said connection brings about a flexion of the finger member to and from the said thumb member.

SAMUEL W. ALDERSON.

REFERENCES CITED

The following references are of record in the file of this patent:

UNITED STATES PATENTS

| Number | Name | Date |
|---|---|---|
| 904,463 | Taylor | Nov. 17, 1908 |
| 1,009,990 | Norton | Nov. 28, 1911 |
| 2,033,150 | Radtke | Mar. 10, 1936 |
| 2,137,345 | McCutcheon | Nov. 22, 1938 |
| 2,259,911 | Tanered et al. | Oct. 21, 1941 |

OTHER REFERENCES

Article in New York Times for July 19, 1946, "Arm Powered by an Electric Motor . . . " written by Meyer Berger. (A copy is in Div. 55 of the Patent Office.)

Terminal Research Reports on Artificial Limbs by Committee on Artificial Limbs National Research Council. (A copy was received in Div. 55 of the Patent Office Nov. 13, 1947, pages 54, 55, 56 and 57.)